United States Patent
Tao et al.

(10) Patent No.: US 11,320,817 B2
(45) Date of Patent: May 3, 2022

(54) TARGET-BASED IMAGE EXPOSURE ADJUSTMENT

(71) Applicant: SZ DJI TECHNOLOGY CO., LTD., Shenzhen (CN)

(72) Inventors: Ye Tao, Shenzhen (CN); Cong Zhao, Shenzhen (CN); Xuyang Feng, Shenzhen (CN); Ruochen Tang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 252 days.

(21) Appl. No.: 16/255,159

(22) Filed: Jan. 23, 2019

(65) Prior Publication Data
US 2019/0171201 A1    Jun. 6, 2019

Related U.S. Application Data

(63) Continuation of application No. PCT/CN2016/092112, filed on Jul. 28, 2016.

(51) Int. Cl.
*H04N 5/232* (2006.01)
*H04N 5/235* (2006.01)
(Continued)

(52) U.S. Cl.
CPC .......... *G05D 1/0038* (2013.01); *B64C 39/024* (2013.01); *B64D 47/08* (2013.01);
(Continued)

(58) Field of Classification Search
CPC ...... G05D 1/0038; G05D 1/0094; G05D 1/12; B64C 39/024; B64C 2201/027;
(Continued)

(56) References Cited

U.S. PATENT DOCUMENTS 8,750,611 B1    6/2014 Vaughn et al.
9,131,150 B1 *  9/2015 Mangiat ............... H04N 5/2352
(Continued)

FOREIGN PATENT DOCUMENTS

CN    102685383 A    9/2012
CN    102084642 B    5/2014
(Continued)

OTHER PUBLICATIONS

The World Intellectual Property Organization (WIPO) International Search Report and Written Opinion for PCT/CN2016/092112 dated Apr. 24, 2017 7 pages.

*Primary Examiner* — Maceeh Anwari
*Assistant Examiner* — Charles Pall
(74) *Attorney, Agent, or Firm* — Anova Law Group, PLLC

(57) ABSTRACT

A method for adjusting image exposure includes, while continuously tracking one or more targets using an imaging device mounted on a movable object, receiving a user indication of a target for imaging, determining a first representation of the target, capturing a first image that includes the first representation of the target, determining an exposure parameter for the imaging device using data in the first image that corresponds to the first representation of the target, determining a second representation of the target, capturing a second image including the second representation of the target, and adjusting the exposure parameter for the imaging device using data in the second image that corresponds to the second representation of the target.

22 Claims, 20 Drawing Sheets

(51) Int. Cl.

| | |
|---|---|
| *B64C 39/02* | (2006.01) |
| *B64D 47/08* | (2006.01) |
| *G06K 9/00* | (2006.01) |
| *G05D 1/00* | (2006.01) |
| *G05D 1/12* | (2006.01) |
| *G08G 5/00* | (2006.01) |

(52) U.S. Cl.
CPC ............. *G05D 1/0094* (2013.01); *G05D 1/12* (2013.01); *G06K 9/0063* (2013.01); *G08G 5/0069* (2013.01); *H04N 5/2351* (2013.01); *H04N 5/2352* (2013.01); *H04N 5/23219* (2013.01); *H04N 5/23293* (2013.01); *B64C 2201/027* (2013.01); *B64C 2201/108* (2013.01); *B64C 2201/127* (2013.01); *B64C 2201/146* (2013.01)

(58) Field of Classification Search
CPC ........ B64C 2201/108; B64C 2201/127; B64C 2201/146; B64D 47/08; G08G 5/0069; H04N 5/23219; H04N 5/23293; H04N 5/2351; H04N 5/2352

See application file for complete search history.

(56) References Cited

U.S. PATENT DOCUMENTS

| | | | |
|---|---|---|---|
| 9,817,396 B1* | 11/2017 | Takayama | G06K 9/00637 |
| 2006/0203108 A1* | 9/2006 | Steinberg | H04N 5/2353 |
| | | | 348/239 |
| 2016/0309067 A1* | 10/2016 | Johansson | H04N 5/23218 |

FOREIGN PATENT DOCUMENTS

| | | |
|---|---|---|
| CN | 105450940 A | 3/2016 |
| CN | 105518555 A | 4/2016 |
| CN | 105519094 A | 4/2016 |

\* cited by examiner

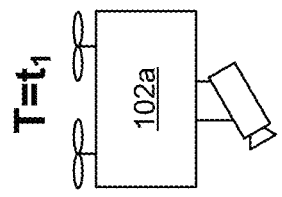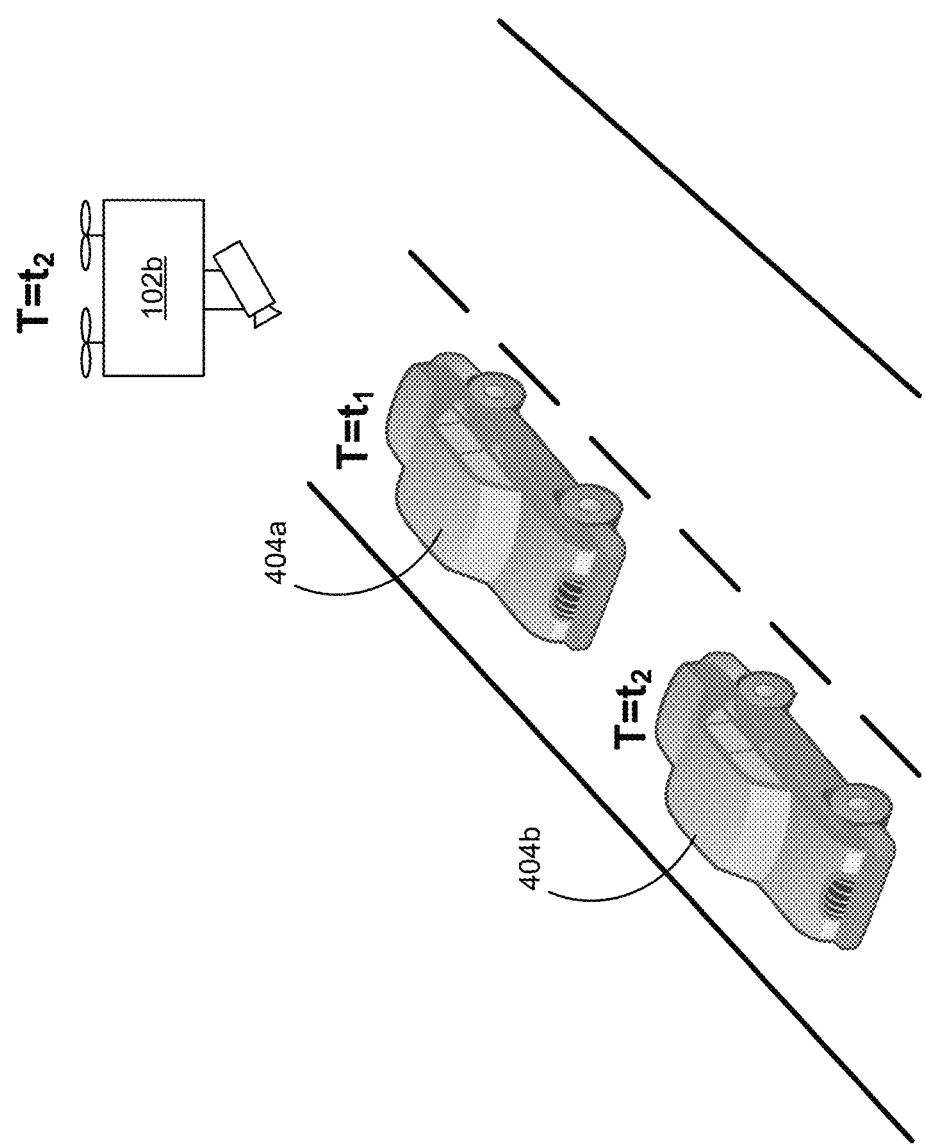
Figure 4

1600

1618
Acquire, by one or more sensors, a measurement of a distance to the target, wherein the second representation of the target within the second image is determined using the measurement of the distance to the target

1620
Determine target movement data in accordance with the first representation of the target within the first image and the second representation of the target within the second image

1622
Adjusting the exposure parameter for the imaging device includes adjusting the exposure parameter for the imaging device using the determined target movement data

1624
Apply a second adjustment to the exposure parameter for the imaging device using the determined target movement data

1626
The data corresponding to the second representation of the target in the second image includes a plurality of light levels determined for distinct points of the second representation of the target; and adjusting the exposure parameter includes: determining an average value based on the plurality of light levels; and adjusting the exposure parameter in accordance with the determined average value

1628
The adjustment to the exposure parameter is determined using data corresponding to at least one portion of the second image that is outside of a region corresponding to the second representation of the target

1630
Adjusting the exposure parameter comprises weighting the data corresponding to the second representation of the target in the second image more highly than the data corresponding to the at least one portion of the second image that is outside of the region corresponding to the second representation of the target

1632
Receiving the indication of the target for imaging includes receiving input data indicating a region corresponding to the target within a prior image captured by the imaging device

---

1634
Transmit, to a remote device, an indication of a region that corresponds to the target

Figure 16C

TARGET-BASED IMAGE EXPOSURE ADJUSTMENT

CROSS-REFERENCE TO RELATED APPLICATION

This application is a continuation of International Application No. PCT/CN2016/092112, filed on Jul. 28, 2016, the entire contents of which are incorporated herein by reference.

TECHNICAL FIELD

The disclosed embodiments relate generally to adjusting an exposure for an image and more particularly, but not exclusively, to adjusting an exposure for an image of an indicated target.

BACKGROUND

Exposure is an indication of an amount of light that reaches an image sensor of an imaging device. Typically, an imaging device meters a light level to determine exposure parameters that will result in an optimal exposure for an image. For example, if a metered level of light is low, a decreased shutter speed (e.g., to allow more time for light to reach an image sensor), increased aperture diameter (e.g., to allow more light to pass through the aperture), and/or increased ISO speed setting (e.g., to increase the sensitivity of the image sensor to light) may be used for capturing images. If a metered level of light is high, an increased shutter speed, decreased aperture diameter, and/or decreased ISO speed setting may be used for capturing images. Various metering modes meter light at particular regions of an image, such as the center of an image frame and/or multiple portions of an image frame, to determine optimal exposure parameters for an image.

SUMMARY

There is a need for systems and methods for adjusting image exposure based on a location of a representation of an image target within an image frame. When a target is known, information about the location of a representation of the target is usable as input to a system for determining one or more exposure parameters. Such systems and methods optionally complement or replace conventional methods for adjusting image exposure.

In accordance with some embodiments, a method for adjusting image exposure comprises, while continuously tracking one or more targets using an imaging device mounted on a movable object: receiving a user indication of a target for imaging; determining, by the imaging device, a first representation of the target; capturing a first image that includes the first representation of the target; determining an exposure parameter for the imaging device using data that corresponds to the first representation of the target in the first image; determining, by the imaging device, a second representation of the target; capturing, by the imaging device, a second image including the second representation of the target; and adjusting the exposure parameter for the imaging device using data in the second image that corresponds to the second representation of the target.

In accordance with some embodiments, an unmanned aerial vehicle (UAV) comprises a propulsion system, an imaging device, and one or more processors coupled to the propulsion system and the imaging device. The one or more processors are configured for, while continuously tracking one or more targets using the imaging device of the UAV: receiving a user indication of a target for imaging; determining, by the imaging device, a first representation of the target; capturing a first image that includes the first representation of the target; determining an exposure parameter for the imaging device using data in the first image that corresponds to the first representation of the target; determining, by the imaging device, a second representation of the target, capturing, by the imaging device, a second image including the second representation of the target; and adjusting the exposure parameter for the imaging device using data in the second image that corresponds to the second representation of the target.

In accordance with some embodiments, a system for adjusting image exposure comprises an imaging device and one or more processors coupled to the imaging device. The one or more processors are configured for, while continuously tracking one or more targets using an imaging device mounted on a movable object: receiving a user indication of a target for imaging; determining, by the imaging device, a first representation of the target; capturing a first image that includes the first representation of the target; determining an exposure parameter for the imaging device using data in the first image that corresponds to the first representation of the target; determining, by the imaging device, a second representation of the target; capturing, by the imaging device, a second image including the second representation of the target; and adjusting the exposure parameter for the imaging device using data in the second image that corresponds to the second representation of the target.

In accordance with some embodiments, a computer readable storage medium stores one or more programs, the one or more programs comprising instructions, which when executed, cause a device to, while continuously tracking one or more targets using an imaging device mounted on a movable object: receive a user indication of a target for imaging; determine, by the imaging device, a first representation of the target; capture a first image that includes the first representation of the target; determine an exposure parameter for the imaging device using data in the first image that corresponds to the first representation of the target; determine, by the imaging device, a second representation of the target; capture, by the imaging device, a second image including the second representation of the target; and adjust the exposure parameter for the imaging device using data in the first image that corresponds to the second representation of the target.

BRIEF DESCRIPTION OF THE DRAWINGS

FIG. 4 illustrates movement of a movable object and a target from a first time $t_1$ to a second time $t_2$, in accordance with some embodiments.

FIGS. 16A-16C are a flow diagram illustrating a method for adjusting image exposure, in accordance with some embodiments.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Typically, when a camera is operated by a user, the user positions the subject of an image within an image frame. Often, the position of a subject within an image frame conforms to traditional image compositions. The multiple modes of automatic light metering commonly available to determine exposure parameters that are suitable for capturing the image of the subject are based on the traditional image compositions.

When a camera is a component of a movable object, such as an unmanned aerial vehicle (UAV), is capturing images of a subject, such as a stationary or moving target, the target may move to positions in an image frame that diverge from traditional image compositions. For example, from time to time the target is located at the edge of an image frame and/or in a small portion of the image frame. The further the target is located from the center of the image frame, the less effective the common automatic metering modes become for determining suitable exposure parameters. There is a need for a metering technique that automatically adjusts the metering region based on a location of a known target within an image frame so that metering occurs within an area that corresponds to the target location.

The following description uses an unmanned aerial vehicle (UAV) as an example of a movable object. UAVs include, e.g., fixed-wing aircrafts and rotary-wing aircrafts such as helicopters, quadcopters, and aircraft having other numbers and/or configurations of rotors. It will be apparent to those skilled in the art that other types of movable objects may be substituted for UAVs as described below.

Figure 1A:
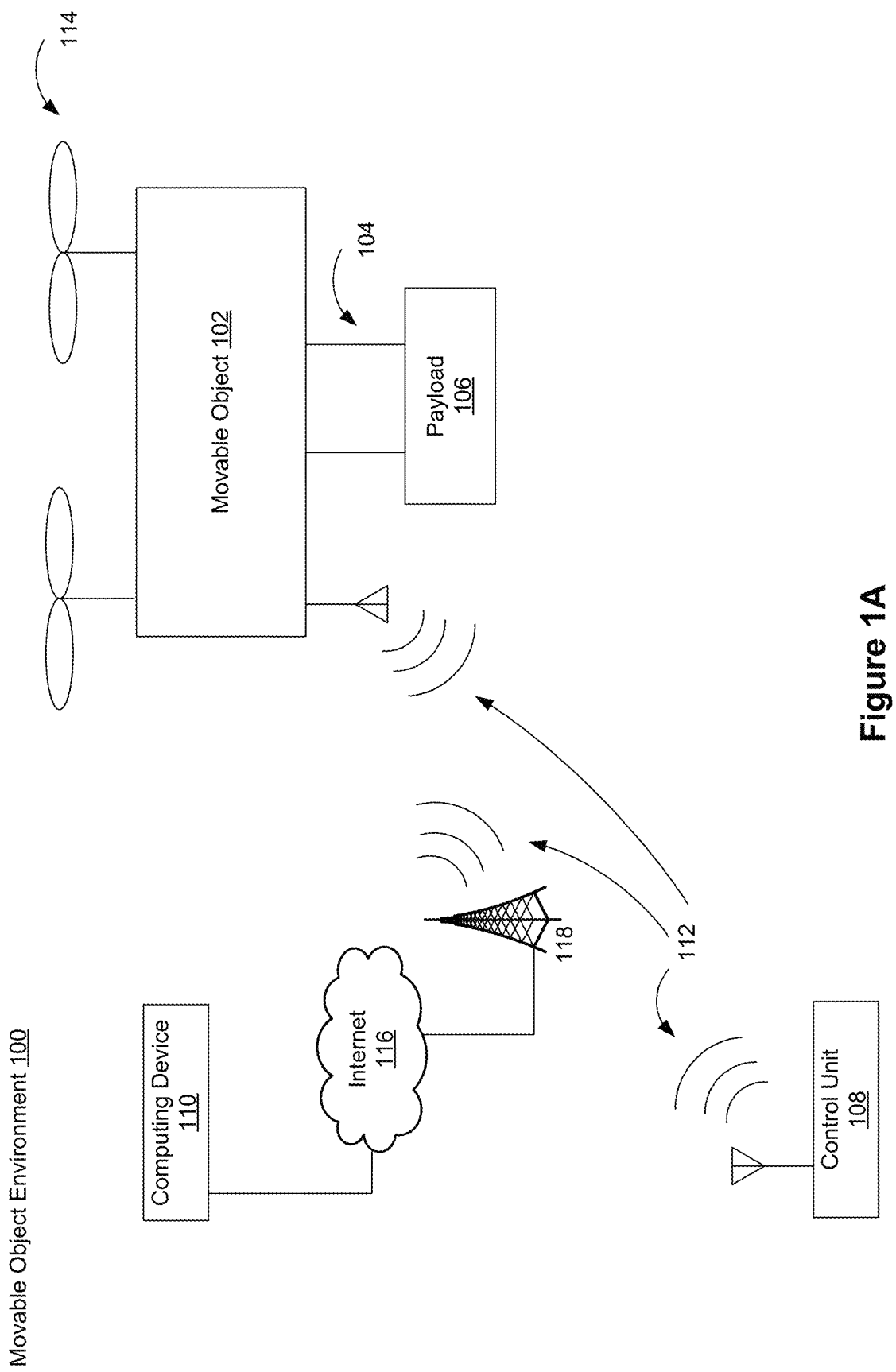
FIGS. 1A-1B illustrate movable object environments, in accordance with some embodiments.

FIG. 1A illustrates a movable object environment 100, in accordance with some embodiments. The movable object environment 100 includes a movable object 102. In some embodiments, the movable object 102 includes a carrier 104 and/or a payload 106.

In some embodiments, the carrier 104 is used to couple a payload 106 to movable object 102. In some embodiments, the carrier 104 includes an element (e.g., a gimbal and/or damping element) to isolate the payload 106 from movement of the movable object 102 and/or the movement mechanism 114. In some embodiments, the carrier 104 includes an element for controlling movement of the payload 106 relative to the movable object 102.

In some embodiments, the payload 106 is coupled (e.g., rigidly coupled) to the movable object 102 (e.g., coupled via the carrier 104) such that the payload 106 remains substantially stationary relative to the movable object 102. For example, the carrier 104 is coupled to the payload 106 such that the payload is not movable relative to the movable object 102. In some embodiments, the payload 106 is mounted directly to the movable object 102 without requiring the carrier 104. In some embodiments, the payload 106 is located partially or fully within the movable object 102.

In some embodiments, a control unit 108 communicates with the movable object 102, e.g., to provide control instructions to the movable object 102 and/or to display information received from the movable object 102. Although the control unit 108 is typically a portable (e.g., handheld) device, the control unit 108 need not be portable. In some embodiments, the control unit 108 is a dedicated control device (e.g., for the movable object 102), a laptop computer, a desktop computer, a tablet computer, a gaming system, a wearable device (e.g., glasses, a glove, and/or a helmet), a microphone, a portable communication device (e.g., a mobile telephone) and/or a combination thereof.

In some embodiments, an input device of the control unit 108 receives user input to control aspects of the movable object 102, the carrier 104, the payload 106, and/or a component thereof. Such aspects include, e.g., attitude, position, orientation, velocity, acceleration, navigation, and/or tracking. For example, a position of an input device of the control unit 108 (e.g., a position of a component of input device) is manually set by a user to a position corresponding to an input (e.g., a predetermined input) for controlling the movable object 102. In some embodiments, the input device is manipulated by a user to input control instructions for controlling the navigation of the movable object 102. In some embodiments, an input device of the control unit 108 is used to input a flight mode for the movable object 102, such as auto pilot or navigation according to a predetermined navigation path.

In some embodiments, a display of the control unit 108 displays information generated by the movable object sensing system 210 (FIGS. 2A-2B), the memory 204 (FIGS. 2A-2B), and/or another system of the movable object 102. For example, the display displays information about the movable object 102, the carrier 104, and/or the payload 106, such as position, attitude, orientation, movement characteristics of the movable object 102, and/or distance between the movable object 102 and another object (e.g., a target and/or an obstacle). In some embodiments, information displayed by a display of the control unit 108 includes images captured by the imaging device 302 (FIG. 3), tracking data (e.g., a graphical tracking indicator applied to a representation of a target), and/or indications of control data transmitted to the movable object 102. In some embodiments, information displayed by the display of the control unit 108 is displayed in substantially real-time as information is received from the movable object 102 and/or as image data is acquired. In some embodiments, the display of the control unit 108 is a touchscreen display.

In some embodiments, the computing device 110 is, e.g., a server computer, desktop computer, a laptop computer, a tablet, or another portable electronic device (e.g., a mobile telephone). In some embodiments, the computing device 110 is a base station that communicates (e.g., wirelessly) with the movable object 102 and/or the control unit 108. In some embodiments, the computing device 110 provides data storage, data retrieval, and/or data processing operations, e.g., to reduce the processing power and/or data storage requirements of the movable object 102 and/or the control unit 108. For example, the computing device 110 is communicatively connected to a database and/or the computing device 110 includes a database. In some embodiments, the computing device 110 is used in lieu of or in addition to the control unit 108 to perform any of the operations described with regard to the control unit 108.

In some embodiments, the movable object 102 communicates with a control unit 108 and/or a computing device 110, e.g., via wireless communications 112. In some embodiments, the movable object 102 receives information from the control unit 108 and/or the computing device 110. For example, information received by the movable object 102 includes, e.g., control instructions for controlling parameters of the movable object 102. In some embodiments, the movable object 102 transmits information to the control unit 108 and/or the computing device 110. For example, information transmitted by the movable object 102 includes, e.g., images and/or video captured by the movable object 102.

In some embodiments, communications between the computing device 110, the control unit 108 and/or the movable object 102 are transmitted via a network (e.g., Internet 116) and/or a wireless signal transmitter (e.g., a long range wireless signal transmitter) such as a cellular tower 118. In some embodiments, a satellite (not shown) is a component of Internet 116 and/or is used in addition to or in lieu of the cellular tower 118.

In some embodiments, information communicated between the computing device 110, the control unit 108 and/or the movable object 102 include control instructions. Control instructions include, e.g., navigation instructions for controlling navigational parameters of the movable object 102 such as position, orientation, attitude, and/or one or more movement characteristics (e.g., velocity and/or acceleration for linear and/or angular movement) of the movable object 102, the carrier 104, and/or the payload 106. In some embodiments, control instructions include instructions for directing movement of one or more of the movement mechanisms 114. For example, control instructions are used to control flight of a UAV.

In some embodiments, control instructions include information for controlling operations (e.g., movement) of the carrier 104. For example, control instructions are used to control an actuation mechanism of the carrier 104 so as to cause angular and/or linear movement of the payload 106 relative to the movable object 102. In some embodiments, control instructions adjust movement of the movable object 102 with up to six degrees of freedom.

In some embodiments, control instructions are used to adjust one or more operational parameters for the payload 106. For example, control instructions include instructions for adjusting a focus parameter and or an orientation of the payload 106 to track a target. In some embodiments, control instructions include instructions for: adjusting imaging properties and/or image device functions, such as adjusting a metering mode (e.g., a number, arrangement, size, and/or location of light metering areas); adjusting one or more exposure parameters (e.g., an aperture setting, a shutter speed, and/or an exposure index); capturing an image; initiating/ceasing video capture; powering an imaging device 302 (FIG. 3) on or off; adjusting an imaging mode (e.g., capturing still images or capturing video); adjusting a distance between left and right components of a stereographic imaging system; and/or adjusting a position, orientation, and/or movement (e.g., pan rate and/or pan distance) of a carrier 104, a payload 106 and/or an imaging device 302.

In some embodiments, when control instructions are received by the movable object 102, the control instructions change parameters of and/or are stored by the memory 204.

Figure 1B:
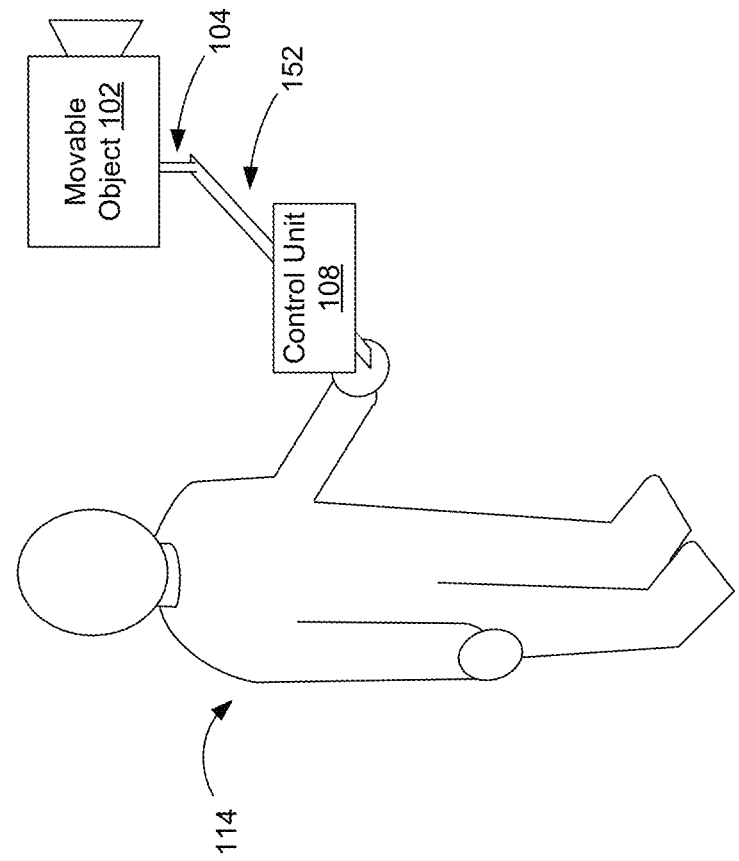

FIG. 1B illustrates a movable object environment 150, in accordance with some embodiments. In the movable object environment 150, the movable object 102 is moved by a movement mechanism 114 that is remote from the movable object 102, e.g., a person, animal, vehicle, dolly, and/or other moving device. For example, the movable object 102 is a device that is handheld and/or wearable. In some embodiments, movable object is coupled (e.g., via the carrier 104) to a support structure 152 that is handheld and/or wearable.

In some embodiments, a carrier 104 is coupled to the movable object 102. In some embodiments, the carrier 104 includes one or more mechanisms that allow the movable object 102 to move relative to a movement mechanism 114 and/or relative to the support structure 152. In some embodiments, the movable object 102 is coupled to the support structure 152 via a carrier 104 that includes a gimbal.

In some embodiments, the movable object 102 is communicatively coupled to the control unit 108 via a wired and/or wireless connection. In some embodiments, information transmitted from the control unit 108 to movable object includes, e.g., control instructions for altering one or more operating parameters of the movable object 102. For example, the movable object 102 receives control instructions for altering an optical parameter of an imaging device 302 of the movable object 102. In some embodiments, information transmitted from the movable object 102 to the control unit 108 includes, e.g., image and/or video data captured by the movable object 102.

Figure 2A:
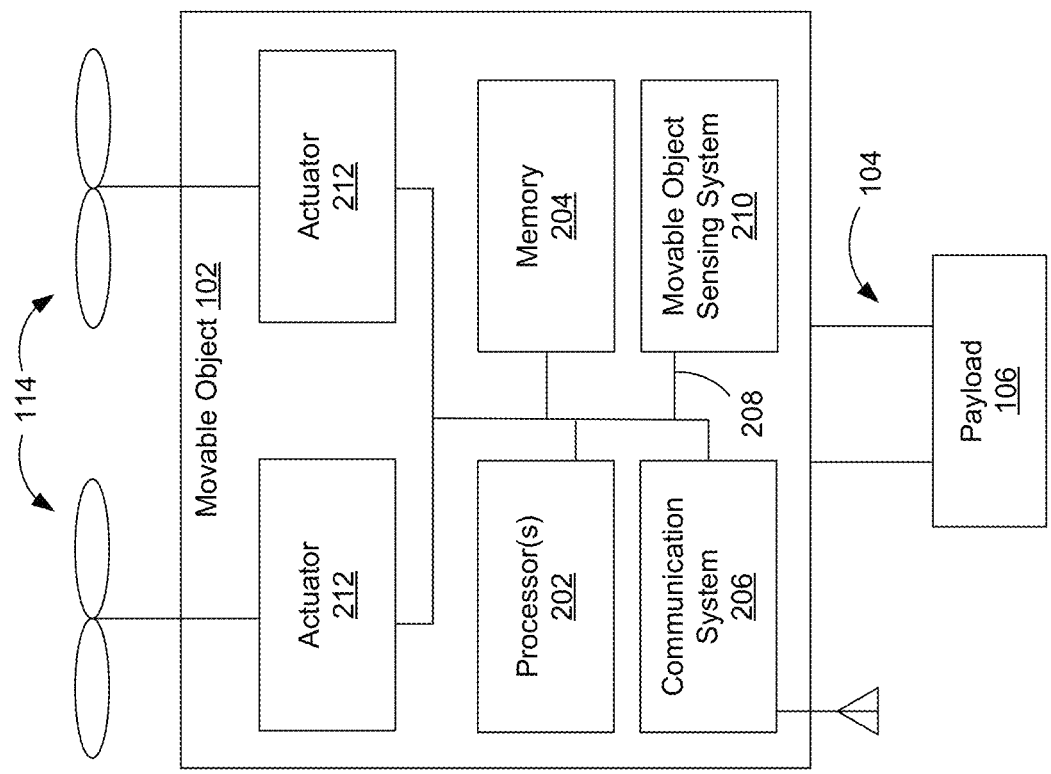
FIG. 2A illustrates a movable object in the movable object environment of FIG. 1A, in accordance with some embodiments.

FIG. 2A illustrates an exemplary movable object 102 in a movable object environment 100, in accordance with some embodiments. The movable object 102 typically includes one or more processing units 202, a memory 204, a communication system 206, a movable object sensing system 210, and a communication bus 208 for interconnecting these components.

In some embodiments, the movable object 102 is a UAV and includes components to enable flight and/or flight control. In some embodiments, the movable object 102 includes a communication system 206 with one or more network or other communications interfaces, the movement mechanisms 114, and/or the movable object actuators 212, which are optionally interconnected with one or more other components of the movable object 102 via the communication bus 208. Although the movable object 102 is depicted as an aircraft, this depiction is not intended to be limiting, and any suitable type of movable object can be used.

In some embodiments, the movable object 102 includes movement mechanisms 114 (e.g., propulsion mechanisms). Although the plural term "movement mechanisms" is used herein for convenience of reference, "movement mechanisms 114" refers to a single movement mechanism (e.g., a single propeller) or multiple movement mechanisms (e.g., multiple rotors). The movement mechanisms 114 include one or more movement mechanism types such as rotors, propellers, blades, engines, motors, wheels, axles, magnets, nozzles, and so on. The movement mechanisms 114 are coupled to movable object 102 at, e.g., the top, bottom, front, back, and/or sides. In some embodiments, the movement mechanisms 114 of a single movable object 102 include multiple movement mechanisms of the same type. In some embodiments, the movement mechanisms 114 of a single movable object 102 include multiple movement mechanisms with different movement mechanism types. The movement mechanisms 114 are coupled to movable object 102 (or vice-versa) using any suitable means, such as support elements (e.g., drive shafts) and/or other actuating elements (e.g., the movable object actuators 212). For example, a movable object actuator 212 receives control signals from the processor(s) 202 (e.g., via the control bus 208) that activates the movable object actuator 212 to cause movement of a movement mechanism 114. For example, the processor(s) 202 include an electronic speed controller that provides control signals to a movable object actuator 212.

In some embodiments, the movement mechanisms 114 enable the movable object 102 to take off vertically from a surface or land vertically on a surface without requiring any horizontal movement of the movable object 102 (e.g., without traveling down a runway). In some embodiments, the movement mechanisms 114 are operable to permit the movable object 102 to hover in the air at a specified position and/or orientation. In some embodiments, one or more of the movement mechanisms 114 are controllable independently of one or more of the other movement mechanisms 114. For example, when the movable object 102 is a quadcopter, each rotor of the quadcopter is controllable independently of the other rotors of the quadcopter. In some embodiments, multiple movement mechanisms 114 are configured for simultaneous movement.

In some embodiments, the movement mechanisms 114 include multiple rotors that provide lift and/or thrust to the movable object 102. The multiple rotors are actuated to provide, e.g., vertical takeoff, vertical landing, and/or hovering capabilities to the movable object 102. In some embodiments, one or more of the rotors spin in a clockwise direction, while one or more of the rotors spin in a counterclockwise direction. For example, the number of clockwise rotors is equal to the number of counterclockwise rotors. In some embodiments, the rotation rate of each of the rotors is independently variable, e.g., for controlling the lift and/or thrust produced by each rotor, and thereby adjusting the spatial disposition, velocity, and/or acceleration of the movable object 102 (e.g., with respect to up to three degrees of translation and/or up to three degrees of rotation).

In some embodiments, the memory 204 stores one or more programs (e.g., sets of instructions), modules, and/or data structures, collectively referred to as "elements" herein. One or more elements described with regard to the memory 204 are optionally stored by the control unit 108, the computing device 110, and/or another device. In some embodiments, the imaging device 302 (FIG. 3) includes memory that stores one or more parameters described with regard to the memory 204.

In some embodiments, the memory 204 stores a controlling system configuration that includes one or more system settings (e.g., as configured by a manufacturer, administrator, and/or user). For example, identifying information for the movable object 102 is stored as a system setting of the system configuration.

In some embodiments, the memory 204 stores one or more exposure parameters used by the imaging device 302 of the movable object sensing system 210. The one or more exposure parameters include, e.g., a shutter speed, an aperture setting (e.g., an aperture diameter), and/or an exposure index. An exposure index is, e.g., an ISO speed setting of a digital camera. For example, an exposure index indicates a setting that indicates a signal gain applied to an image sensor 304 of the imaging device 302.

In some embodiments, the memory 204 includes an imaging device adjustment module. The imaging device adjustment module stores, e.g., instructions for adjusting one or more exposure parameters. In some embodiments, the one or more exposure parameters are adjusted using output of the imaging device 302 (light metering output). For example, when an image subject moves from a first position within a first image to a second position within a second image, the image device adjustment module adjusts the one or more exposure parameters based on information about the image subject (e.g., a size and/or position of a target) within the second image. In some embodiments, the one or more exposure parameters are adjusted in response to control instructions (e.g., received by the movable object 102 from the control unit 108 and/or the computing device 110).

In some embodiments, the memory 204 stores information about one or more targets, e.g.: identifying information of a target; a GPS location of the target; target type information such as color, texture, pattern, size, shape, and/or dimension of a target; an image of a target; an initial position (e.g., location coordinates, such as pixel coordinates within an image) of a target; and/or a size of a target within one or more images (e.g., images captured by the imaging device 302 of the movable object sensing system 210). The target type information is, e.g., provided by a user to a user input device, such as a user input device of the control unit 104. In some embodiments, the user selects a pre-existing target pattern or type (e.g., a black object or a round object with a radius greater or less than a certain value). In some embodiments, user input to provide target type information includes user selection of one or more targets from within one or more images (e.g., images captured by the imaging device 302 of the movable object sensing system 210 and displayed by the control unit 108). In some embodiments, features or characteristics of the selected targets are extracted and/or generalized to produce the target type information, which is used, e.g., to identify targets with features or characteristics indicated by the target type information. In some embodiments, feature extraction is performed by the control unit 108, the processor(s) 202 of movable object 102, and/or the computing device 110.

In some embodiments, the targeting information is used by the movable object 102 to track a target. For example, the targeting information is used by a tracking module for adjusting one or more movement parameters of the movable object 102 in response to information about the position and/or size of a target within an image captured by the imaging device 302. In some embodiments, targeting information is used by an image analysis module to identify a target.

The above identified modules or programs (i.e., sets of instructions) need not be implemented as separate software programs, procedures or modules, and thus various subsets of these modules may be combined or otherwise re-arranged in various embodiments. In some embodiments, the memory 204 stores a subset of the modules and data structures identified above. Furthermore, the memory 204 may store additional modules and data structures not described above. In some embodiments, the programs, modules, and data structures stored in the memory 204, or a non-transitory computer readable storage medium of the memory 204, provide instructions for implementing respective operations in the methods described below. In some embodiments, some or all of these modules may be implemented with specialized hardware circuits that subsume part or all of the module functionality. One or more of the above identified elements may be executed by one or more of the processors 202 of the movable object 102. In some embodiments, one or more of the above identified elements is executed by one or more processors of a device remote from the movable object 102, such as processor(s) of the control unit 108 and/or processor(s) of the computing device 110.

The communication system 206 enables communication with the control unit 108 and/or the computing device 110, e.g., via the wireless signals 112. The communication system 206 includes, e.g., transmitters, receivers, and/or transceivers for wireless communication. In some embodiments, the communication is one-way communication, such that data is only received by the movable object 102 from the control unit 108 and/or the computing device 110, or vice-versa. In some embodiments, communication is two-way communication, such that data is transmitted in both directions between the movable object 102 and the control unit 108 and/or the computing device 110. In some embodiments, the movable object 102, the control unit 108, and/or the computing device 110 are connected to the Internet 116 or other telecommunications network, e.g., such that data generated by the movable object 102, the control unit 108, and/or the computing device 110 is transmitted to a server for data storage and/or data retrieval (e.g., for display by a website).

In some embodiments, the sensing system 210 of the movable object 102 includes one or more sensors. In some embodiments, one or more sensors of the movable object sensing system 210 are mounted to the exterior, located within, or otherwise coupled to the movable object 102. In some embodiments, one or more sensors of the movable object sensing system 210 are components of the carrier 104, the payload 106, and or the imaging device 302. Where sensing operations are described herein as being performed by the movable object sensing system 210, it will be recognized that such operations are optionally performed by one or more sensors of the carrier 104, the payload 106, and or the imaging device 302 in addition to or in lieu of one or more sensors of the movable object sensing system 210.

The movable object sensing system 210 generates static sensing data (e.g., a single image captured in response to a received instruction) and/or dynamic sensing data (e.g., a series of images captured at a periodic rate, such as a video).

In some embodiments, the movable object sensing system 210 includes an image sensor 304. For example, the movable object sensing system 210 includes an image sensor 304 that is a component of an imaging device 302 (FIG. 3), such as a camera. In some embodiments, the movable object sensing system 210 includes multiple image sensors, such as a pair of image sensors for stereographic imaging (e.g., a left stereographic image sensor and a right stereographic image sensor).

In some embodiments, the movable object sensing system 210 includes one or more audio transducers. For example, an audio detection system includes an audio output transducer (e.g., a speaker) and/or an audio input transducer (e.g., a microphone, such as a parabolic microphone). In some embodiments, microphone and a speaker are used as components of a sonar system. A sonar system is used, for example, to provide a three-dimensional map of the surroundings of the movable object 102.

In some embodiments, the movable object sensing system 210 includes one or more infrared sensors. In some embodiments, a distance measurement system for measuring a distance from the movable object 102 to an object or surface includes one or more infrared sensors, such a left infrared sensor and a right infrared sensor for stereoscopic imaging and/or distance determination.

Figure 3:
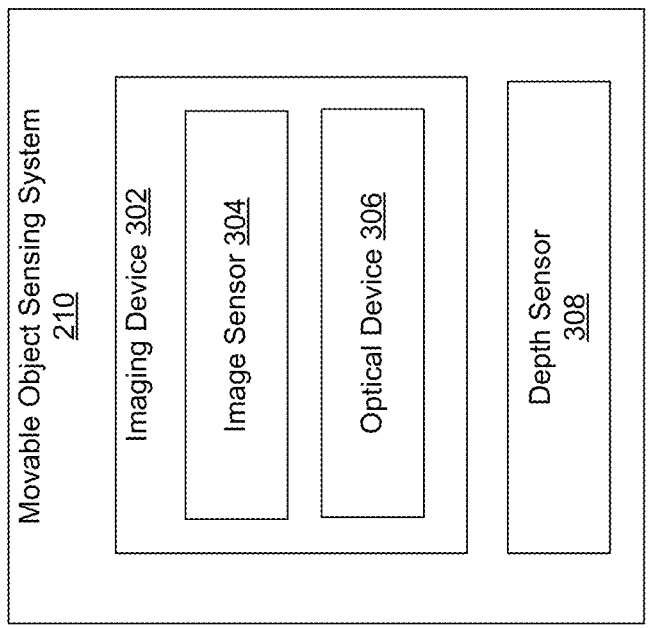
FIG. 3 illustrates an exemplary movable object sensing system, in accordance with some embodiments.

In some embodiments, the movable object sensing system 210 includes a depth sensor 308, e.g., as described further with regard to FIG. 3.

In some embodiments, the movable object sensing system 210 includes an attitude sensor 312. The attitude sensor 312 includes, e.g., an accelerometer, a magnetometer, one or more potentiometers, one or more Hall sensors, and/or a gyroscope, e.g., for detecting an attitude of the imaging device 302 and/or the movable object 102.

In some embodiments, the movable object sensing system 210 includes one or more global positioning system (GPS) sensors, motion sensors (e.g., accelerometers), rotation sensors (e.g., gyroscopes), inertial sensors, proximity sensors (e.g., infrared sensors) and/or weather sensors (e.g., pressure sensor, temperature sensor, moisture sensor, and/or wind sensor).

In some embodiments, sensing data generated by one or more sensors of the movable object sensing system 210 and/or information determined using sensing data from one or more sensors of the movable object sensing system 210 is used as a depth sensor 308 for depth detection, e.g., the image sensor, the audio sensor, and/or the infrared sensor (and/or pairs of such sensors for stereo data collection) are used to determine a distance from the movable object 102 to another object, such as a target, an obstacle, and/or terrain.

In some embodiments, sensing data generated by one or more sensors of the movable object sensing system 210 and/or information determined using sensing data from one or more sensors of the movable object sensing system 210 are transmitted to the control unit 108 and/or the computing device 110 (e.g., via the communication system 206). In some embodiments, data generated by one or more sensors of the movable object sensing system 210 and/or information determined using sensing data from one or more sensors of the movable object sensing system 210 is stored by the memory 204.

In some embodiments, the movable object 102, the control unit 108, and/or the computing device 110 use sensing data generated by sensors of the sensing system 210 to determine information such as a position of the movable object 102, an orientation of the movable object 102, movement characteristics of the movable object 102 (e.g., angular velocity, angular acceleration, translational velocity, translational acceleration and/or direction of motion along one or more axes), and/or proximity of the movable object 102 to potential obstacles, targets, weather conditions, locations of geographical features and/or locations of manmade structures.

Figure 2B:
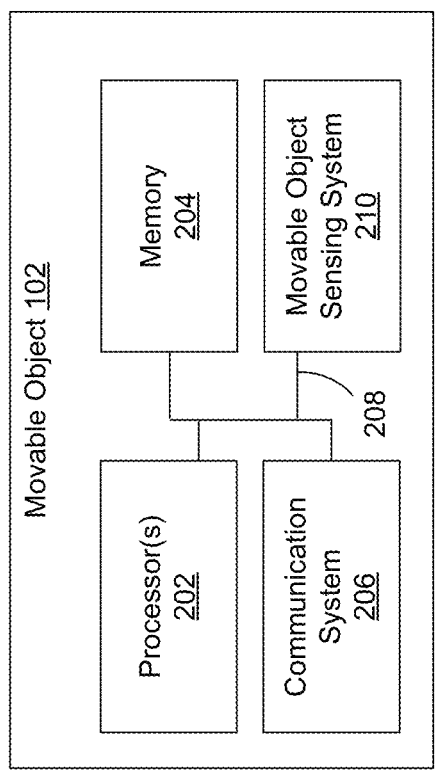
FIG. 2B illustrates a movable object in the movable object environment of FIG. 1B, in accordance with some embodiments.

FIG. 2B illustrates an exemplary movable object 102 in a movable object environment 150, in accordance with some embodiments. A movable object 102 in the movable object environment 150 is moved by a movement mechanism 114 that is remote from the movable object 102 (e.g., as described with regard to FIG. 1B). The movable object 102 of the movable object environment 150 includes, e.g., one or more processing units 202 (e.g., as described above with regard to FIG. 2A), a memory 204 (e.g., as described above with regard to FIG. 2A), a sensing system 210 (e.g., as described above with regard to FIG. 2A), and/or a communication bus 208 (e.g., as described above with regard to FIG. 2A) for interconnecting these components. In some embodiments, the movable object 102 is communicatively coupled to a control unit 108, e.g., via a communication system 206.

FIG. 3 illustrates an exemplary sensing system 210 of the movable object 102, in accordance with some embodiments. In some embodiments, the movable object sensing system 210 includes an imaging device 302 (e.g., a camera for capturing still images and/or video, such as a digital camera, an aerial camera, a pan-tilt-zoom camera, and/or a camcorder). In some embodiments, the imaging device 302 is the payload 106 and/or is a component of the payload 106. In some embodiments, the imaging device 302 is a component of (e.g., fully and/or partially contained within and/or attached to a frame and/or body of) the movable object 102. The imaging device 302 includes an image sensor 304 and an optical device 306. In some embodiments, the optical device 306 is moved relative to the image sensor 304 by an imaging device actuator.

The image sensor 304 is, e.g., a sensor that detects light, such as visible light, infrared light, and/or ultraviolet light. In some embodiments, the image sensor 304 includes, e.g., semiconductor charge-coupled devices (CCD), active pixel sensors using complementary metal-oxide-semiconductor (CMOS) and/or N-type metal-oxide-semiconductors (NMOS, Live MOS).

The optical device 306 affects the focus of light that arrives at the image sensor 304. For example, the optical device 306 is a lens or a device including multiple lenses (e.g., a compound lens). A lens is, e.g., a material having curved surfaces that give rise to lens properties, such as causing light rays to converge (e.g., at a focal length) and/or diverge.

In some embodiments, the imaging device 302 meters light using a through-the-lens metering approach, e.g., using an image captured by the image sensor 304 of light that passes through the optical device 306. In some embodiments, a light meter (e.g., including one or more silicon photodiodes) that is distinct from the image sensor 304 is used for metering light. In some embodiments, one or more light levels (e.g., luminance values) determined by metering light (e.g., using the through-the-lens metering approach and/or one or more light meters distinct from the image sensor 304) is used to determine one or more exposure parameters.

In some embodiments, the movable object sensing system 210 includes a depth sensor 308. The depth sensor 308 includes, e.g., one or more pressure sensors (such as an acoustic transducer), one or more infrared sensors, and/or one or more image sensors. For example, the depth sensor 308 includes a pair of imaging devices 302 for stereographic imaging (e.g., a left imaging device and a right imaging device), a pair of infrared sensors for stereographic infrared imaging, and/or a pair of pressure sensors for stereo sonar sensing. The depth sensor 308 is used, e.g., to determine a distance from the movable object 102 to another object, such as a target, an obstacle, and/or terrain.

FIG. 4 illustrates movement of a movable object 102 and a target 404 from a first time $t_1$ to a second time $t_2$, in accordance with some embodiments. At time $T=t_1$, the movable object 102 is at a first position as illustrated by a representation 102a of the movable object 102 and the target 404 is at a first location illustrated by at a representation 404a of the target 404. At time $T=t_2$ (e.g., a time that is after time $t_1$), the movable object 102 has moved to a second position as illustrated by a representation 102b of the movable object 102 and the target 404 has moved to a second location illustrated by a representation 404b of the target 404.

Figure 5:
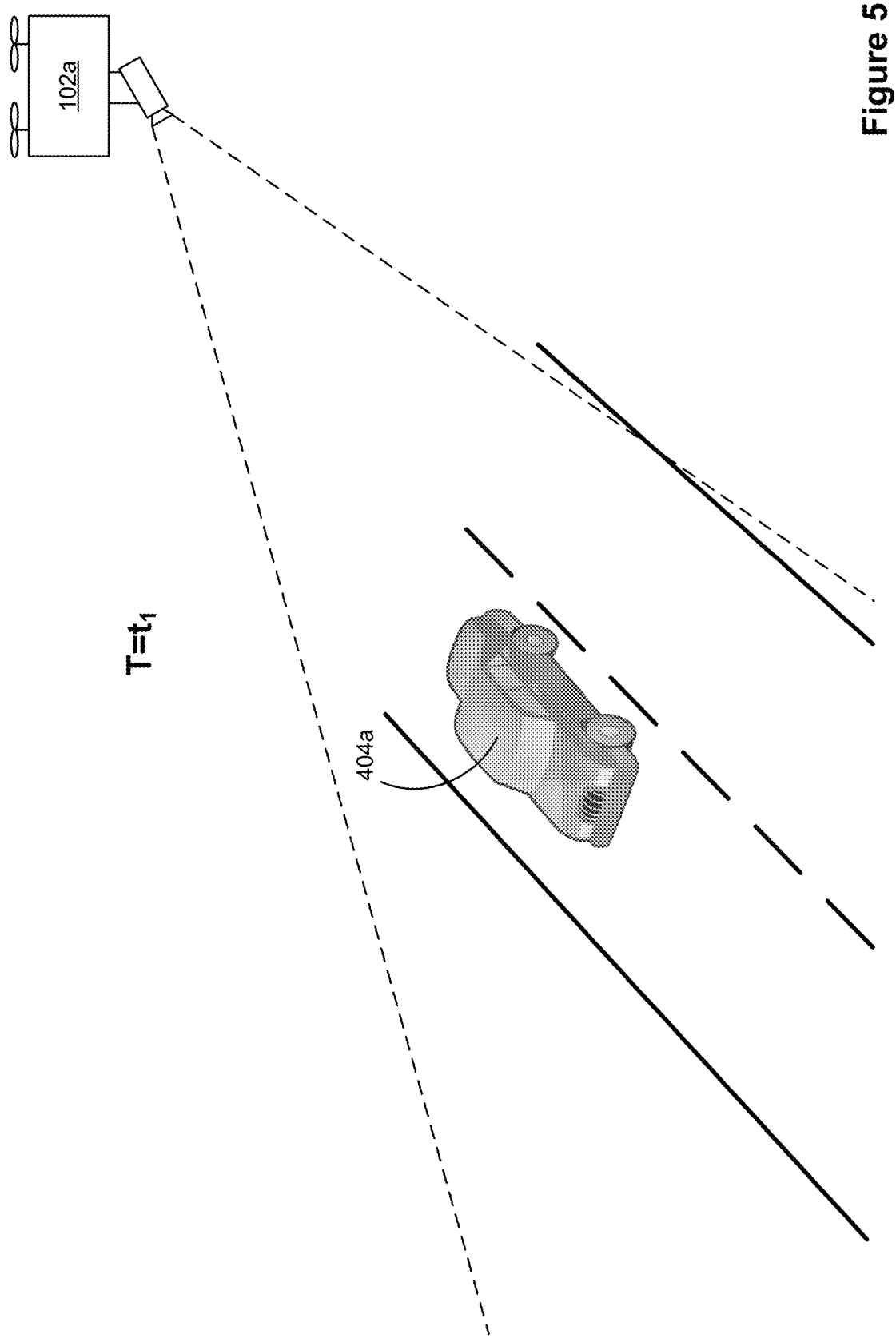
FIG. 5 illustrates a context in which an image captured by a movable object at time $t_1$, in accordance with some embodiments.

FIG. 5 illustrates a context in which an image is captured by the imaging device 302 of the movable object 102 at time $t_1$, in accordance with some embodiments. An image 700 as shown in FIG. 7A is captured by the imaging device 302 of the movable object 102 at time $t_1$.

Figure 6:
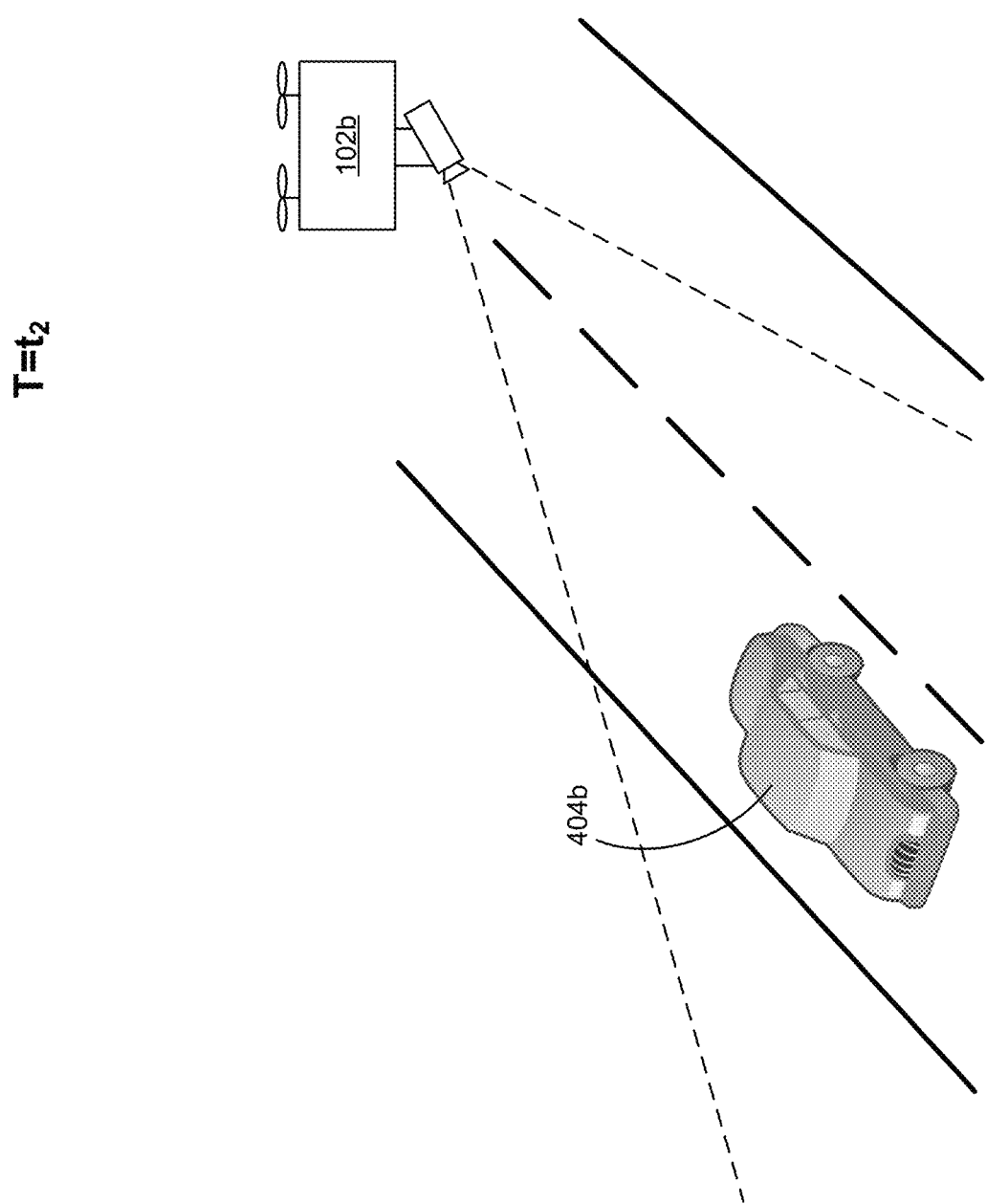
FIG. 6 illustrates a context in which an image is captured by a movable object at time $t_2$, in accordance with some embodiments.
Figure 7B:
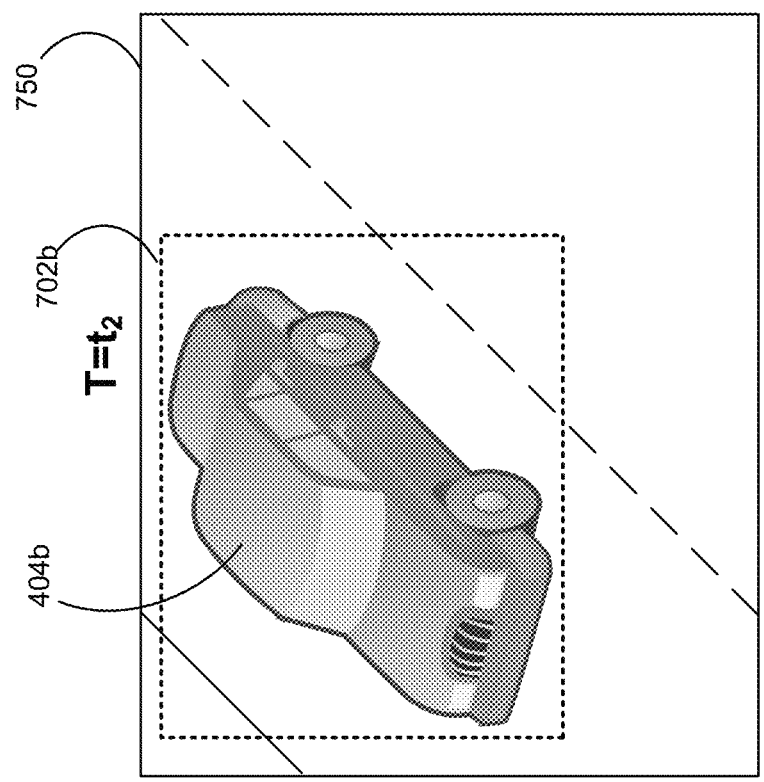
FIG. 7B illustrates a region that corresponds to a target in the image captured by the movable object at time $t_2$, in accordance with some embodiments.

FIG. 6 illustrates a context in which an image is captured at time $t_2$, in accordance with some embodiments. An image 750 as shown in FIG. 7B is captured by an imaging device 302 of a movable object 102 at time $t_2$.

Figure 7A:
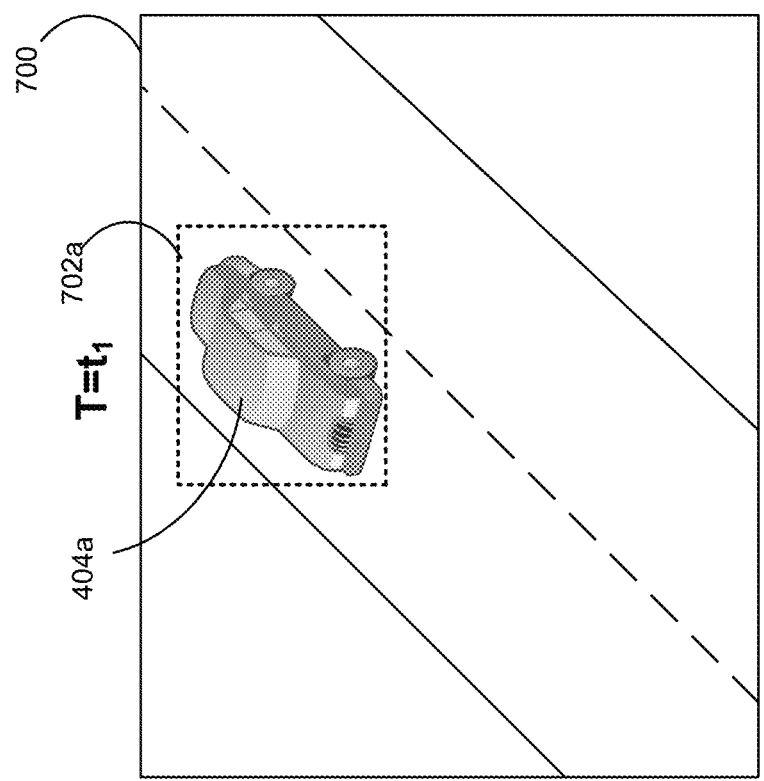
FIG. 7A illustrates a region that corresponds to a target in the image captured by the movable object at time $t_1$, in accordance with some embodiments.

FIG. 7A illustrates a region 702a (e.g., a region 702 of an image 700 captured at time $t_1$) that corresponds to the representation 404a of target 404 as captured in the image 700. FIG. 7B illustrates a region 702b (e.g., a region 702 of an image 750 captured at time $t_2$) that corresponds to the representation 404b of target 404 as captured in image 750. In some embodiments, the region 702 has a variable size (e.g., as shown in FIGS. 7A-7B, region 702b is larger than region 702a). For example, the position and/or size of the region 702 within an image (e.g., 700, 750) is determined based on the position and/or size of the representation of the target 404 within the image. In some embodiments, the region 702 has a fixed size (e.g., the center of the region 702 is located at a position that corresponds to a centroid of a representation of a target 404 within the image). In some embodiments, the region 702 is updated based on movement of target 404 as movable object 102 tracks the target 404.

Figure 8A:
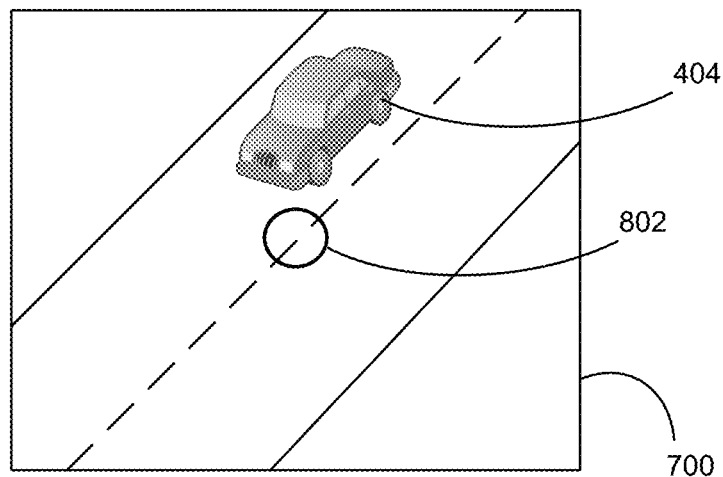
FIGS. 8A-8C illustrate light metering techniques for determining one or more exposure parameters, in accordance with some embodiments.
Figure 8B:
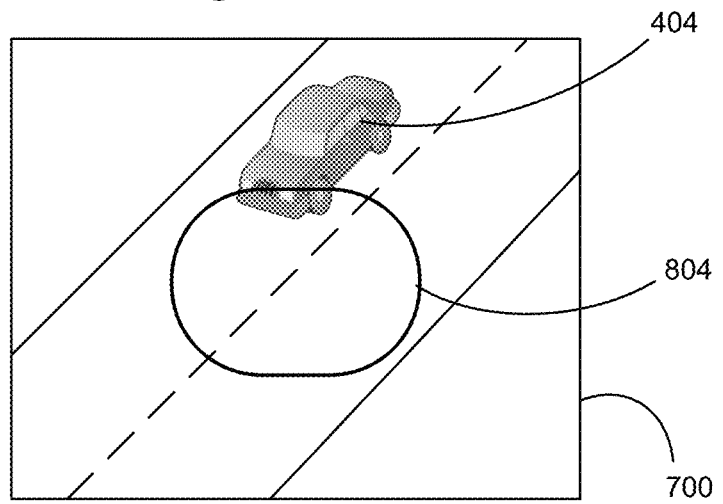
Figure 8C:
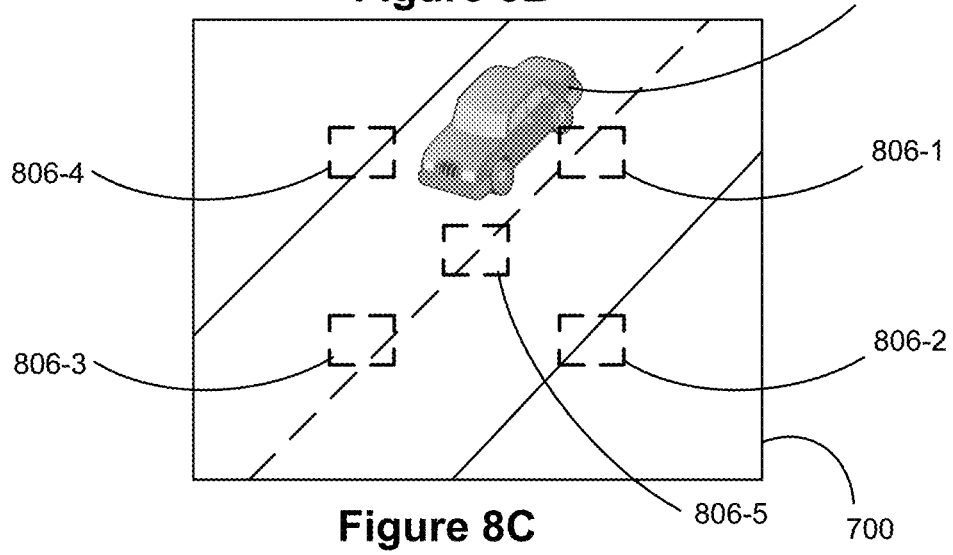

FIGS. 8A, 8B, and 8C illustrate spot metering, center metering, and multi-zone metering techniques, respectively, for determining one or more exposure parameters. For example, when a through-the-lens light metering system is used, light passes through the optical device 306 and is incident on the image sensor 304. A value that corresponds to light detected by the image sensor 304 in at least one area (e.g., at least one metering area) of the image sensor 304 is used to determine at least one exposure parameter for capturing subsequent images.

In FIG. 8A, a spot metering technique is illustrated. A spot metering area 802 indicates a portion of the image 700 that corresponds to a metering area of an image sensor 304. For example, light levels (e.g., of pixels) within the spot metering area 802 of the image sensor 304 are used (e.g., averaged) to determine one or more exposure parameters. In some embodiments, a first subset of light levels within the area of the image sensor 304 indicated by the spot metering area 802 are weighted more highly than a second subset of light levels within the area of the image sensor 304 indicated by the spot metering area 802, and an averaged light level value is determined using the weighted values.

In FIG. 8B, a center metering technique is illustrated. A center metering area 804 indicates a portion of the image 700 that corresponds to a metering area of an image sensor 304. For example, light levels (e.g., of pixels) within the center metering area 804 of the image sensor 304 are used (e.g., averaged) to determine one or more exposure parameters. In some embodiments, a first subset of light levels within the area of image sensor 304 indicated by the center metering area 804 are weighted more highly than a second subset of light levels within the area of image sensor 304 indicated by the center metering area 804, and an averaged light level value is determined using the weighted values.

In FIG. 8C, a multi-zone metering technique is illustrated. Multi-zone metering areas 806-1, 806-2, 806-3, 806-4, and 806-5 indicate portions of the image 700 that correspond to metering areas of an image sensor 304. For example, light levels (e.g., of pixels) within the metering areas of the image sensor 304 are used to determine one or more exposure parameters. In some embodiments, a first set of one or more zones is weighted more highly than a second set of one or more zones that is distinct from the first set of one or more zones, and an averaged light level value is determined using the weighted values.

Figure 9A:
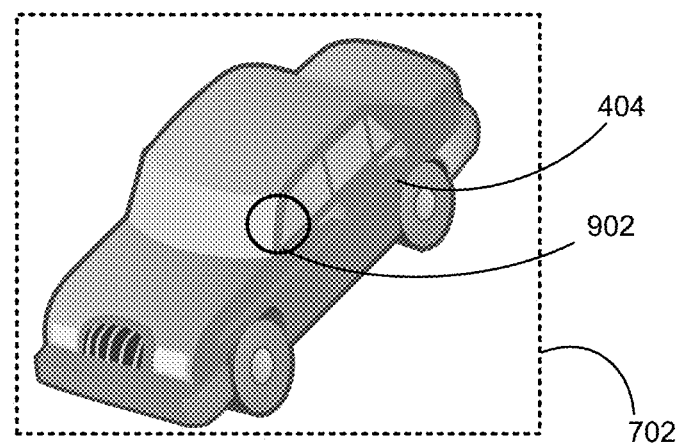
FIGS. 9A-9C illustrate light metering techniques applied within a region that corresponds to a target, in accordance with some embodiments.
Figure 9B:
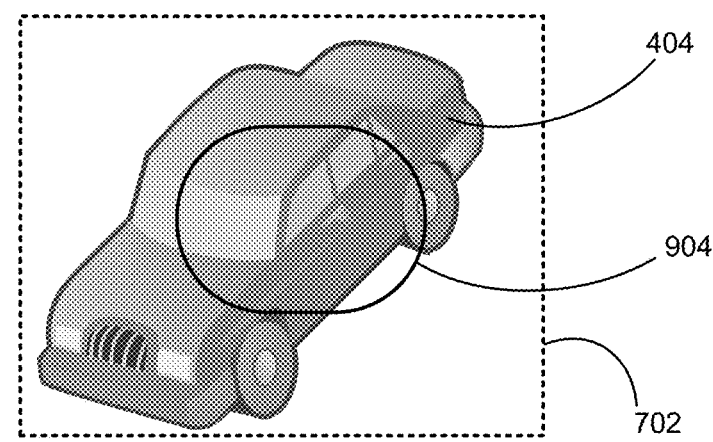
Figure 9C:
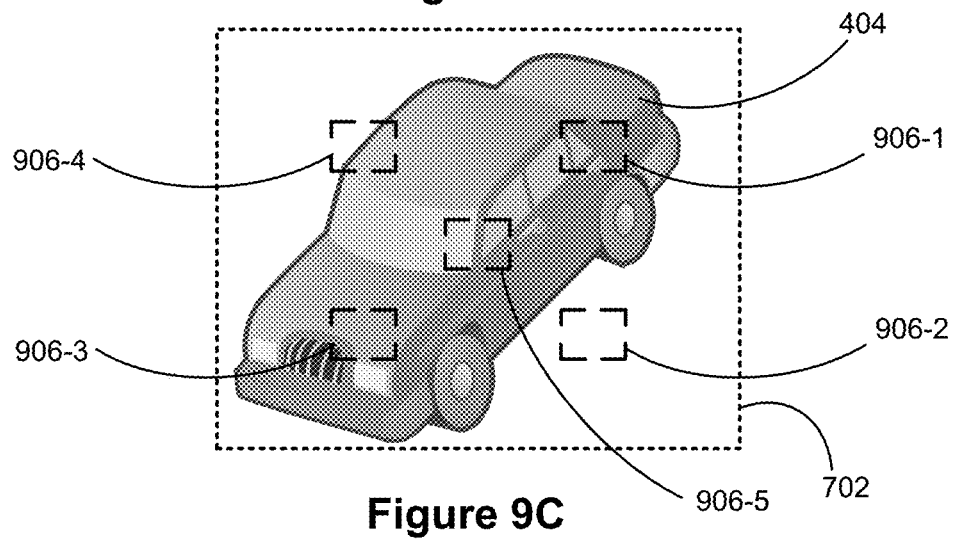

In FIGS. 8A-8C, the spot metering area 802, the center metering area 804, and the multi-zone metering areas 806-1 to 806-5 have varying levels of correspondence to the location of a representation of the target 404 within image 700. For example, in FIG. 8A, no part of the target 404 is located in the spot metering area 802; in FIG. 8B, a small part of the target 404 is located in the center metering area 804; and in FIG. 8C, a small part of the target 404 is located in the multi-zone metering area 806-1. As a result, one or more exposure parameters determined using values from the metering areas (e.g., 802, 804, and/or 806-1 to 806-5) are likely to produce an exposure that is optimized for portions of the image 700 that surround the target 404 rather for than the region of the image 700 that corresponds to the target 404. As illustrated in FIG. 9A-9C, by isolating a region of the image 700 that corresponds to the region 702 that includes the target 404 and performing light metering within the region 702, light metering results are more likely to produce exposure parameters that are optimized for the target 404 in comparison with the metering described with regard to FIGS. 8A-8C.

FIGS. 9A-9C illustrate spot metering, center metering, and multi-zone metering techniques, respectively, applied to a region 702 of the image 700 that corresponds to the target 404.

In FIG. 9A, a spot metering technique is illustrated. Spot metering area 902 indicates a portion of region 702a that corresponds to a metering area of an image sensor 304. For example, light levels (e.g., of pixels) within the spot metering area 902 of the image sensor 304 are used (e.g., averaged) to determine one or more exposure parameters. In some embodiments, a first subset of light levels within the area of the image sensor 304 indicated by spot weighting area 902 are weighted more highly than a second subset of light levels within the area of the image sensor 304 indicated by spot weighting area 902, and an averaged light level value is determined using the weighted values.

In FIG. 9B, a center metering technique is illustrated. A center metering area 904 indicates a region 702a that corresponds to a metering area of an image sensor 304. For example, light levels (e.g., of pixels) within the metering area of the image sensor 304 are used (e.g., averaged) to determine one or more exposure parameters. In some embodiments, a first subset of light levels within the area of the image sensor 304 indicated by the center metering area 904 are weighted more highly than a second subset of light levels within the area of image sensor 304 indicated by the center metering area 904, and an averaged light level value is determined using the weighted values.

In FIG. 9C, a multi-zone metering technique is illustrated. Multi-zone metering areas 906-1, 906-2, 906-3, 906-4, and 906-5 indicate regions of the region 702a that correspond to metering areas of an image sensor 304. For example, light levels (e.g., of pixels) within the metering areas of the image sensor 304 are used to determine one or more exposure parameters. In some embodiments, a first set of one or more zones is weighted more highly than a second set of one or more zones that is distinct from the first set of one or more zones, and an averaged light level value is determined using the weighted values.

Figure 10B:
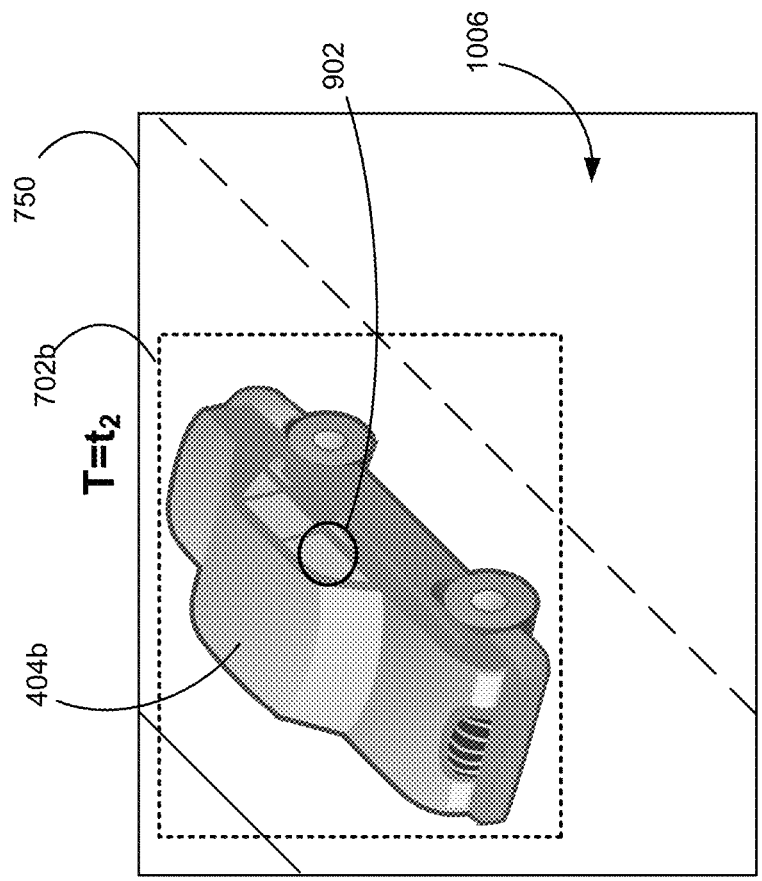
FIG. 10B illustrates spot metering applied within a region in the image captured by the movable object at time $t_2$, in accordance with some embodiments.

Whereas the metering areas 802, 804, and 806-1 to 806-5 of FIGS. 8A-8C are located at a fixed location within an image 700 corresponding to a fixed location within the image sensor 304, in some embodiments, the metering areas 902, 904, and/or 906-1 to 906-5 of FIGS. 9A-9C are at locations within the image sensor 304 that change as the location of the region (e.g., the region 702a, the region 702b) within an image (e.g., the image 700, the image 750) changes. For example, as shown in FIGS. 10A-10B, the spot metering area 902 is located at different positions relative to the boundaries of the images 700 and 750.

In some embodiments, as the movable object 102 tracks the target 404, the region 702 and/or one or more metering areas are updated based on the position of target 404 within an image.

Figure 10A:
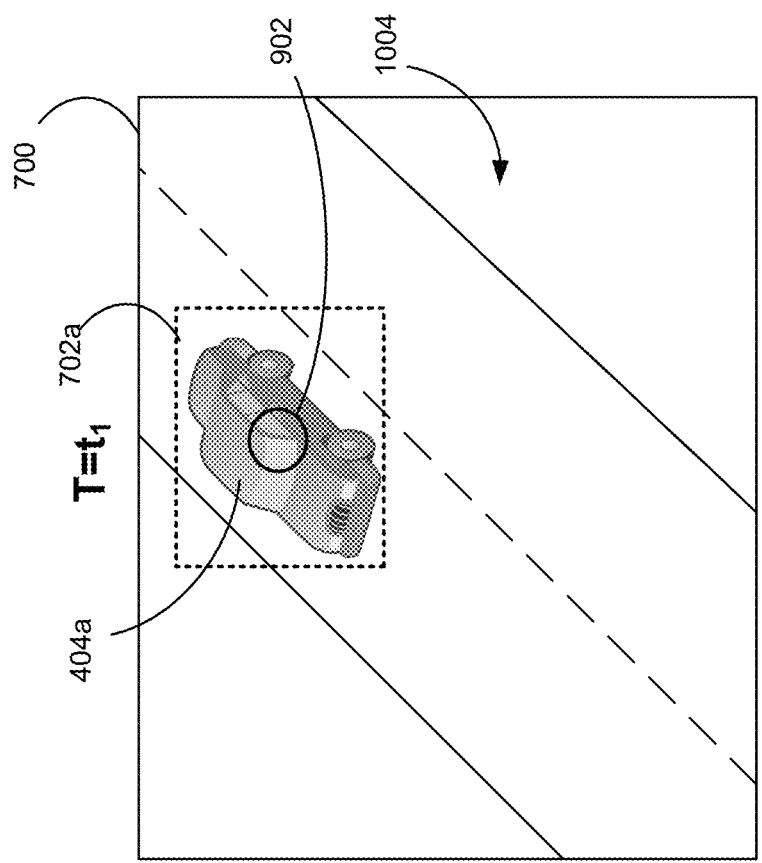
FIG. 10A illustrates spot metering applied within a region in the image captured by the movable object at time $t_1$, in accordance with some embodiments.

In FIG. 10A, the spot metering area 902 is located at a first location that corresponds to the center of the region 702a of the image 700. In FIG. 10B, the spot metering area 902 is located at a second location in the center of the region 702b in the image 750.

In some embodiments, the area of the spot metering area 902 does not change when the size of the region 702 changes. For example, as shown in FIGS. 10A-10B, spot metering area 902 has the same area in the region 702a as the area of the spot metering area 902 in the region 704b (which has a larger area than the region 702a).

In some embodiments, the size of one or more metering areas is adjusted based on (e.g., in proportion to) the size of an area of the region 702. For example, in some embodiments, an area of one or more metering areas (e.g., 902, 904, and/or 906-1 to 906-5) is larger in the region 702b relative to the size of the one or more metering areas in the region 702a (which has a smaller area than the region 702b).

By tying a metering area, such as the spot metering area 902, the center metering area 904, and/or the multi-zone metering areas 906-1 to 906-5, to a region 702 that is based on a location of the target 404 within an image (e.g., 700, 750), the light metering that is performed produces one or more exposure parameters that are optimized for the target 404 rather than being optimized for the overall image (e.g., 700, 750). In this way, overexposure and/or underexposure of the target 404 within an image is avoided.

It will be recognized that metering areas other than the illustrative metering areas described with regard to FIGS. 8A-8C and FIGS. 9A-9C may be used. For example, different numbers, arrangements, sizes, and/or locations of metering areas may be used. In some embodiments, light metering is performed using all of the pixels of an image (e.g., the image 700 and/or the image 750) and/or all of the pixels of a region of an image (e.g., the region 702a and/or the region 702b).

Figure 11:
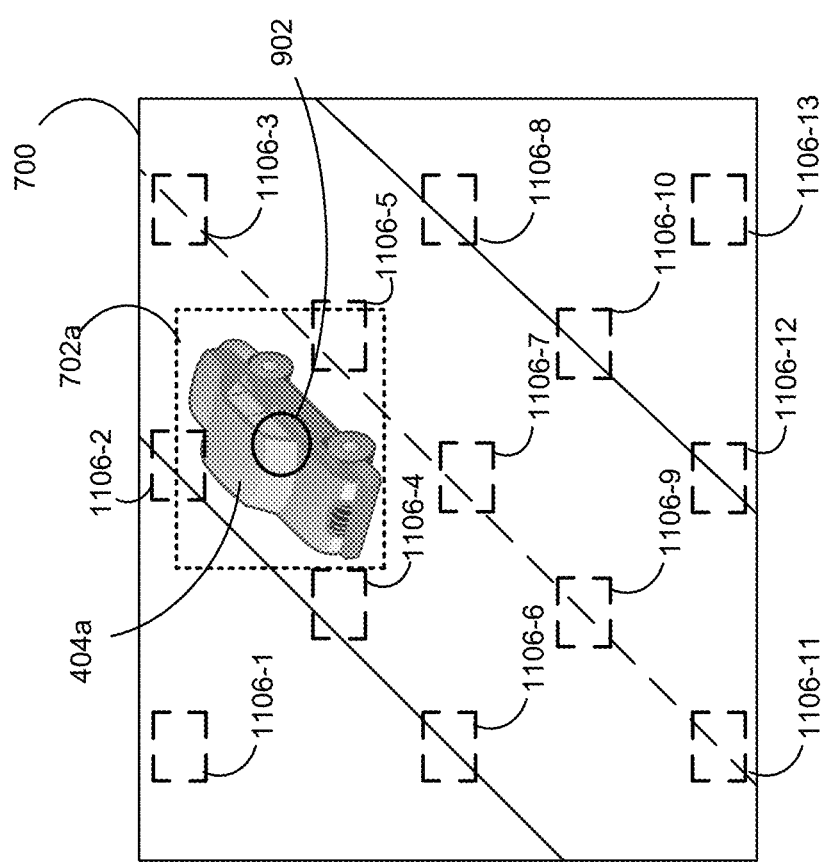
FIG. 11 illustrates a set of metering areas that includes a metering area outside a region that corresponds to a location of a target within an image, in accordance with some embodiments.

FIG. 11 illustrates a set of metering areas that includes a metering area outside a region 702 that corresponds to a location of a target 404 within an image. In some embodiments, at least one portion of the image 700 outside the region 702 is used for determining an adjustment to one or more exposure parameters. For example, light metering is performed in at least one area at a location that corresponds to the region 702 (e.g., the metering area 902), and light metering is additionally performed in at least one area that is at least partially outside the region 702 (e.g., one or more of metering areas 1106-1, 1106-2, 1106-3, 1106-4, 1106-5, 1106-6, 1106-7, 1106-8, 1106-9, 1106-10, 1106-11, 1106-12, and 1106-13). In some embodiments, determining a light meter value includes assigning a greater weight to at least one metering area that is within the region 702 (e.g., a weight assigned to the metering area 902) than a weight assigned at least one metering area that is at least partially outside the region 702 (e.g. a weight assigned to metering areas 1106-1 to 1106-13), and an averaged light level value is determined using the weighted values. In some embodiments, one or more exposure adjustment parameters are determined using the light meter value.

In some embodiments, the movable object 102 uses a depth sensor 308 to measure a distance between the movable object 102 and the target 404. In some embodiments, the movable object 102 uses the measured distance to determine a size of the region 700 corresponding to the target 404 within an image (e.g., the image 700 and/or the image 750).

Figure 12:
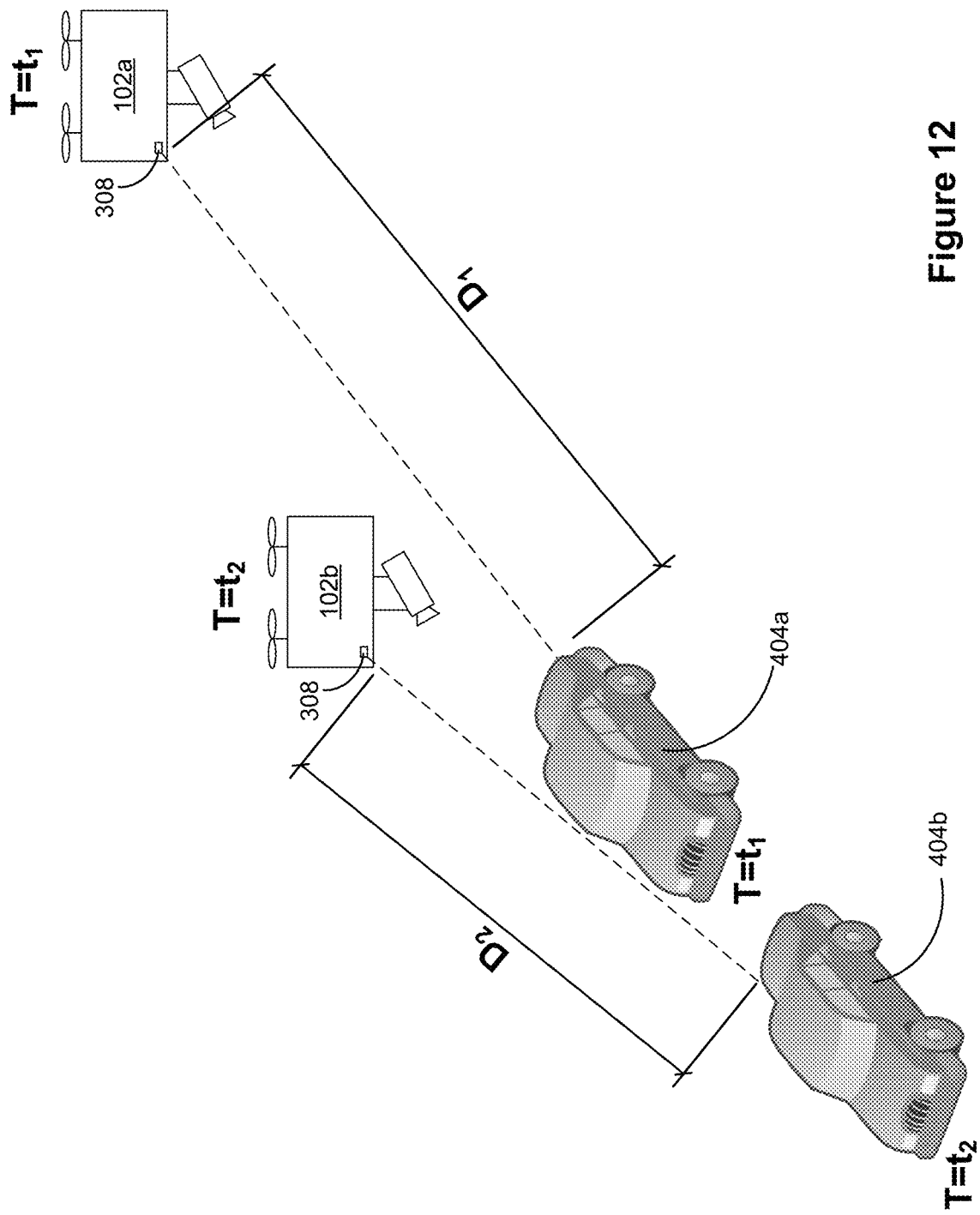
FIG. 12 illustrates distances $D_1$ and $D_2$ between a movable object and a target as measured at two different times $t_1$ and $t_2$, in accordance with some embodiments.

FIG. 12 illustrates distances $D_1$ and $D_2$ between the movable object 102 and the target 404 as measured at two different times $t_1$ and $t_2$, in accordance with some embodiments. A position of the movable object 102 at a time $t_1$ is indicated by the movable object 102a and a position of the target 404 at time $t_1$ is indicated by the target 404a. At time $t_1$, the depth sensor 308 measures a distance $D_1$ between the movable object 102a and the target 404a. A position of the movable object 102 at a time $t_2$ is indicated by the movable object 102b and a position of the target 404 at time $t_2$ is indicated by the target 404b. At time $t_2$, the depth sensor 308 measures a distance $D_2$ between the movable object 102b and the target 404b. In some embodiments, in accordance with a determination that a distance between the movable object 102 and the target 404 has decreased (e.g., the distance $D_2$ is less than the distance $D_1$), the size of region 702 within which light metering is performed is increased. In some embodiments, in accordance with a determination that a distance between the movable object 102 and the target 404 has increased (e.g., the distance $D_2$ is greater than the distance $D_1$), the size of region 702 within which light metering is performed is decreased. In some embodiments, a number of pixels of image sensor 304 used for metering light increases as the size of the region 702 increases (e.g., the number of pixels of image sensor 304 increases proportional to the size of the region 702). In some embodiments, a number of metering areas increases as the size of the region 702 increases. In some embodiments, a size of at least one metering area increases as the size of the region 702 increases.

FIGS. 13A-13F illustrate spot metering, center metering, and multi-zone metering techniques applied to a region 702a and a region 702b of the image 700 that corresponds to the target 404a.

Figure 13A:
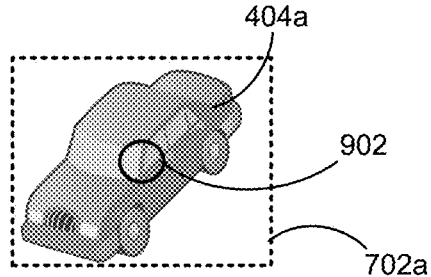
FIGS. 13A-13F illustrate spot metering, center metering, and multi-zone metering techniques applied to a region that corresponds to a target in the image captured by the movable object at time $t_1$ and applied to a region that corresponds to a target in the image captured by the movable object at time $t_2$.
Figure 13B:
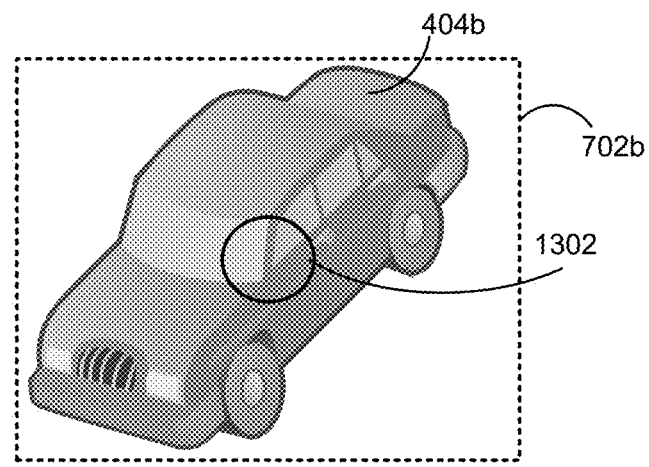

In FIG. 13A, the spot metering area 902 indicates a portion of region 702a that corresponds to a metering area of an image sensor 304. In FIG. 13B, a spot metering area 1302 indicates a portion of the region 702b that corresponds to a metering area of the image sensor 304. In some embodiments, the area of the spot metering area 1302 is greater than the area of the spot metering area 902 (e.g., in accordance with a determination that the area of the region 702b is larger than the area of the region 702a and/or in accordance with a determination that a distance from the movable object 102b to the target 404b is less than a distance from the movable object 102a to the target 404a). For example, the area of the spot metering area 1302 relative to the area of the spot metering area 902 is proportional to the area of the region 702b relative to the area of the region 702a.

Figure 13C:
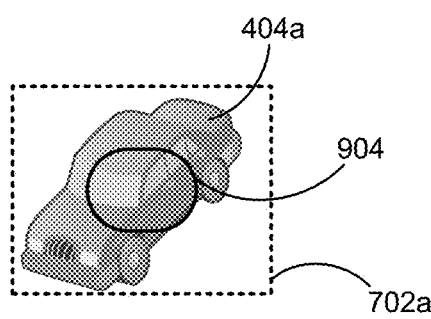
Figure 13D:
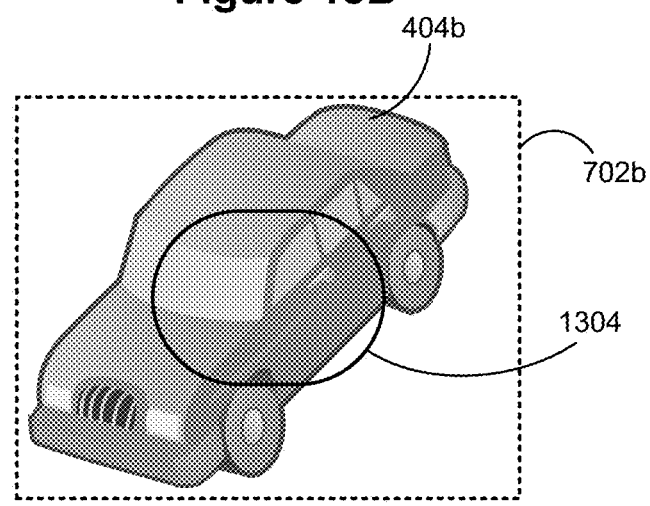

In FIG. 13C, the center metering area 904 indicates a portion of the region 702a that corresponds to a metering area of an image sensor 304. In FIG. 13D, the center metering area 1304 indicates a portion of the region 702b that corresponds to a metering area of the image sensor 304. In some embodiments, the area of the center metering area 1304 is greater than the area of the center metering area 904 (e.g., in accordance with a determination that the area of region 702b is larger than the area of region 702a and/or in accordance with a determination that a distance from the movable object 102b to the target 404b is less than a distance from the movable object 102b to the target 404b). For example, the area of the center metering area 1304 relative to the area of the center metering area 904 is proportional to the area of the region 702b relative to the area of the region 702a.

Figure 13E:
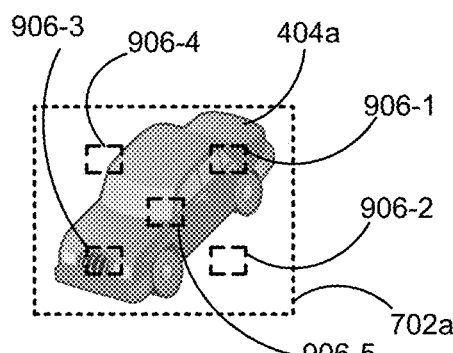
Figure 13F:
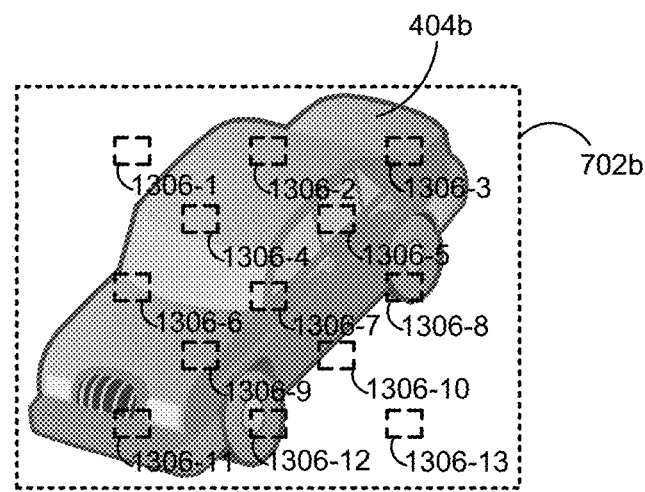

In FIG. 13E, multi-zone metering areas 906-1, 906-2, 906-3, 906-4, and 906-5 indicate portions of the region 702a that correspond to metering areas of an image sensor 304. In FIG. 13F, the multi-zone metering areas 1306-1, 1306-2, 1306-3, 1306-4, 1306-5, 1306-6, 1306-7, 1306-8, 1306-9, 1306-10, 1306-11, 1306-12, and 1306-13 indicate portions of the region 702b that correspond to the metering areas of the image sensor 304. In some embodiments, the number of metering areas in FIG. 13F (e.g., metering areas 1306-1 to 1306-13) is greater than the number of metering areas in FIG. 13E (e.g., metering areas 906-1 to 906-5) (e.g., in accordance with a determination that the area of the region 702b is larger than the area of the region 702a and/or in accordance with a determination that a distance from the movable object 102b to the target 404b is less than a distance from the movable object 102b to the target 404b). For example, the number of metering areas in FIG. 13F relative to the number of metering areas in FIG. 13E is proportional to the area of the region 702b relative to the area of the region 702a.

Figure 14:
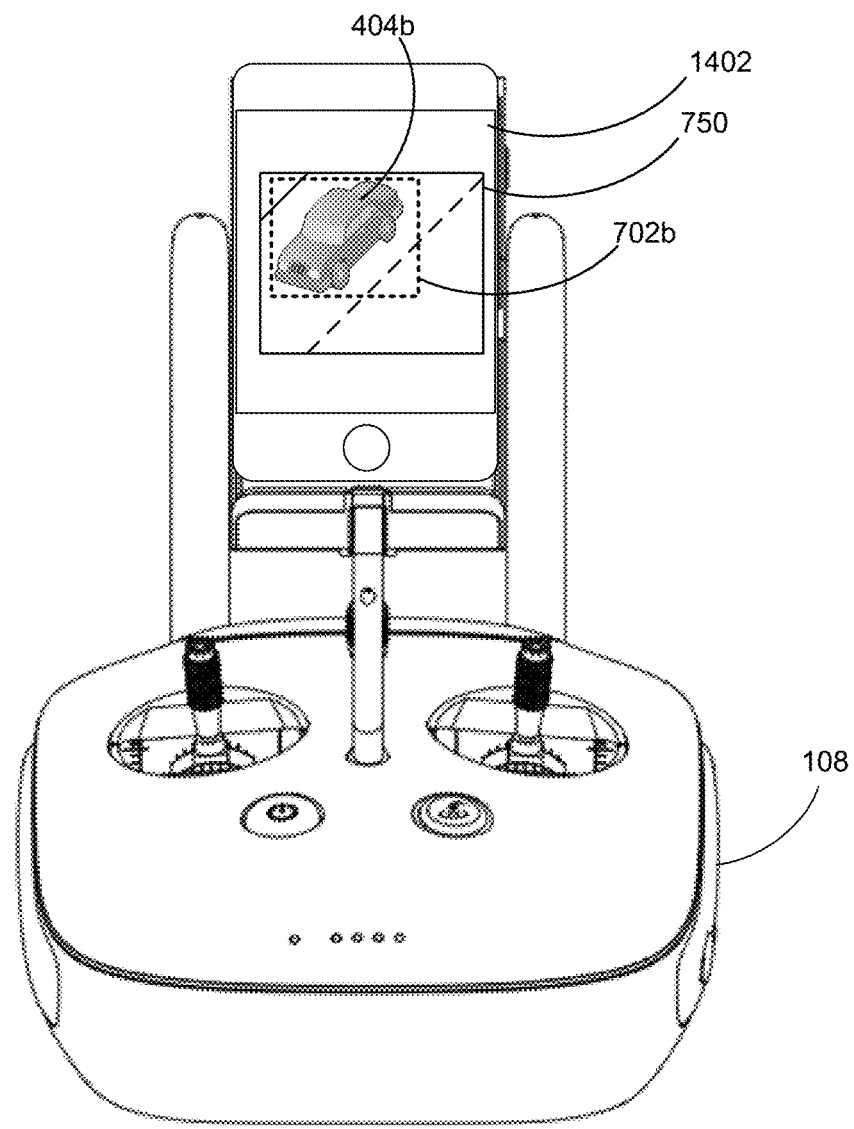
FIG. 14 illustrates display by a control unit of an image captured by a movable object.

FIG. 14 illustrates display by a control unit 108 of an image captured by the imaging device 302 of the movable object 102. In some embodiments, the movable object 102 transmits, e.g., via the communication system 206, images (e.g., still images and/or video) captured by the imaging device 302 to the control unit 108. For example, the image 750 received from the movable object 102 is displayed by a display 1402 of the control unit 108. In some embodiments, a representation of one or more regions 702, such as the region 702b (e.g., a boundary of the region 702b) is displayed by the control unit 108 (e.g., superimposed over the image 750). In this way, a user is provided with feedback indicating the area of the image 750 that is being used for light metering and/or adjusting one or more exposure parameters. In some embodiments, one or more metering areas is displayed by control unit 108 (e.g., superimposed over the image 750 and/or the region 702b). In some embodiments, only a portion of the image 750 that corresponds to the region 702b is displayed by the control unit 108.

Figure 15:
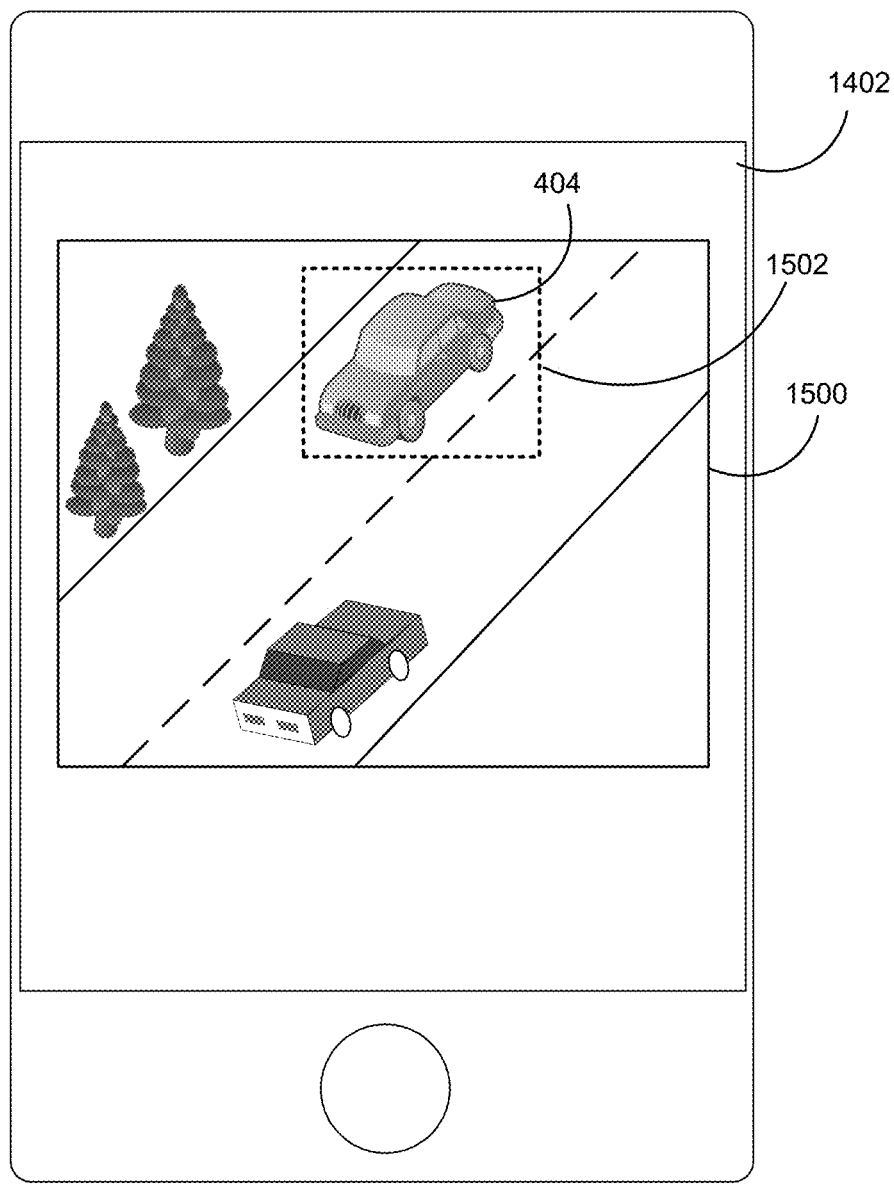
FIG. 15 illustrates selection of a target, in accordance with some embodiments.

FIG. 15 illustrates selection of a target 404, in accordance with some embodiments. FIG. 15 shows the display 1402 of the control unit 108. In some embodiments, a user provides input at the control unit 108 (e.g., using a touchscreen input or another input device) to select a target 404. For example, the display 1402 of the control unit 108 displays an image 1500 received from the movable object 102. In some embodiments, a user selects the target 404 e.g., by touching a touchscreen of the display 1402 at a location that corresponds to the target 404 and/or by providing input using another input device of the control unit 108. In some embodiments, a selected region that corresponds to a selected target is indicated by a selection indicator 1502. In some embodiments, the control unit 108 provides information that corresponds to the selected target 404 (e.g., an image that corresponds to a selected region and/or target identifying information) to the movable object 102 and/or the computing device 110. In some embodiments, the control unit 108, the movable object 102, and/or the computing device 110 perform image processing on an image corresponding to a selected region, e.g., to determine target identifying information. In some embodiments, the movable object 102 uses target identifying information and/or an image that corresponds to a selected region for tracking the target 404.

In some embodiments, when a target 404 is selected as described with regard to FIG. 15, a region that corresponds to the selected target 404 is used for determining an adjustment to one or more exposure parameters (e.g., regardless of whether the target.

Figure 16A:
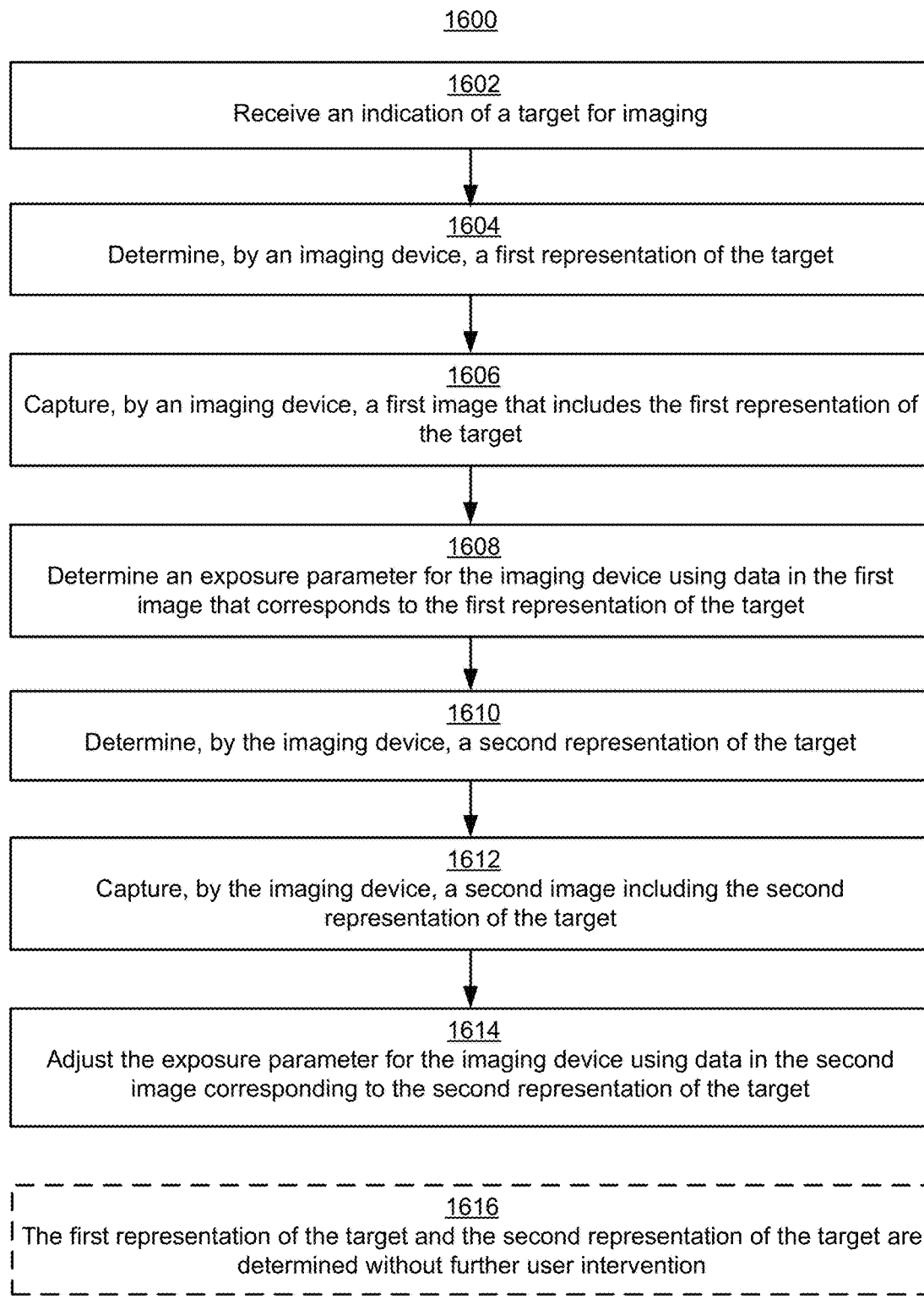

FIGS. 16A-16C are a flow diagram illustrating a method 1600 for adjusting image exposure, in accordance with some embodiments. The method 1600 is performed at a device, such as the movable object 102, the imaging device 302, the control unit 108 and/or the computing device 110. For example, instructions for performing the method 1600 are stored in the memory 204 and executed by the processor(s) 202. In some embodiments, the method 1600 is performed while an imaging device 302 mounted on the movable object 102 continuously tracks one or more targets.

The device receives (1602) a user indication of a target for imaging. For example, a user indication of a target for imaging includes, e.g., identifying information of a target 404; a GPS location of the target 404; target type information of the target 404, an image of the target 404; an initial position of the target 404; and/or a size of the target 404 within one or more images (e.g., images captured by the imaging device 302 of the movable object sensing system 210). In some embodiments, the indication of the target for imaging is provided by a user to a user input device, such as a user input device of the control unit 108. In some embodiments, the user may select a pre-existing target pattern or type of the target 404. In some embodiments, user input to provide target type information includes user selection of the target 404 from one or more images (e.g., as described with regard to FIG. 15). In some embodiments, features and/or characteristics of the selected targets are extracted and/or generalized to produce target type information, which is used, e.g., to identify targets with features or characteristics indicated by the target type information. In some embodiments, feature extraction is performed by the movable object 102, control unit 108, and/or the computing device 110.

In some embodiments, the indication of the target for imaging includes specific target information for a specific target 404. Specific target information includes, e.g., an image of target 404, an initial position (e.g., location coordinates, such as pixel coordinates within an image) of target 404, and/or a size of target 404 within one or more images (e.g., images captured by imaging device 302 of movable object 102). A size of target 404 is stored, e.g., as a size indicator such as a length, an area, a number of pixels in a line (e.g., indicating a length, width, and/or diameter), a ratio of a length of a representation of the target in an image relative to a total image length (e.g., a percentage), a ratio of an area of a representation of the target in an image relative to a total image area (e.g., a percentage), and/or a number of pixels indicating an area of target 404. In some embodiments, a distance of the target 404 from the movable object 102 that corresponds to a size indicator is stored (e.g., an area of the target 404 changes based on a distance of the target 404 from the movable object 102).

In some embodiments, targeting information (including, e.g., target type information and/or information for a specific target) is generated based on user input, e.g., as described with regard to FIG. 15. In some embodiments, targeting information is determined using stored previous images of the target 404 (e.g., images captured by the imaging device 302 and stored by the memory 204). In some embodiments, targeting information is generated using a computer-generated image of the target 404.

In some embodiments, targeting information is used by the movable object 102 to track the target 404. In some embodiments, targeting information is used by an image analysis module to identify the target 404 (e.g., in one or more images captured by movable object the 102). In some cases, target identification involves image recognition and/or matching algorithms. In some embodiments, target identification includes comparing two or more images to determine, extract, and/or match features contained therein.

The device uses the imaging device 302 to determine (1604) a first representation (e.g., 404a) of the target 404, e.g., as shown in FIG. 7A.

The device uses the imaging device 302 to capture (1606) a first image (e.g., image 700) that includes the first representation (e.g., 404a) of the target 404.

The device determines (1608) an exposure parameter (e.g., a shutter speed, an aperture, and/or an exposure index) for the imaging device 302 using data corresponding to the first representation (e.g., 404a) of the target 404. For example, the device meters light to determine one or more luminance values that correspond to one or more meter areas (e.g., as described with regard to FIGS. 8A-8C, 9A-9C, 10A-10B, 11, and/or 13A-13F). In some embodiments, the data corresponding to the first representation of the target 404 is data determined from one or more metering areas in a region (e.g., 702a) that corresponds to the representation (e.g., 404a) of the target 404. The device uses the one or more luminance values (e.g., an average or weighted average of the luminance values) to determine one or more exposure parameters.

The device uses the imaging device 302 to determine (1610) a second representation (e.g., 404b) of the target 404, e.g., as shown in FIG. 7B.

The device uses the imaging device 302 to capture (1612) a second image (e.g., the image 750) including the second representation (e.g., 404b) of the target 404.

The device adjusts (1614) the exposure parameter for the imaging device using data corresponding to the second representation (e.g., 404b) of the target 404. For example, the device meters light to determine one or more luminance values that correspond to one or more meter areas (e.g., as described with regard to FIGS. 8A-8C, 9A-9C, 10A-10B, 11, and/or 13A-13F). In some embodiments, the data corresponding to the second representation of the target 404 is data determined from one or more metering areas in a region (e.g., 702b) that corresponds to the representation (e.g., 404b) of the target 404. In some embodiments, at least one of the one or more metering areas used to determine one or more luminance values for the second representation 404b of the target 404 is distinct from at least one of the one or more metering areas used to determine one or more luminance values for the first representation 404a of the target. For example, a number, size, arrangement, and/or location of metering areas used to determine one or more luminance values for the first representation 404a is different from a number, size, arrangement, and/or location of metering areas used to determine one or more luminance values for the second representation 404b. In some embodiments, the same metering areas are used to determine one or more luminance values for the first representation 404a and the second representation 404b. In some embodiments, the device uses the one or more luminance values (e.g., an average or weighted average of the luminance values) to adjust one or more exposure parameters.

In some embodiments, the device determines (1616) the first representation of the target and the second representation of the target without further user intervention. For example, the device applies a tracking algorithm to track the target and/or maintain part or all of the target within the image frame.

In some embodiments, the device acquires (1618) by one or more sensors (e.g. the depth sensor 308), a measurement of a distance to the target (e.g., distance $D_2$, as described with regard to FIG. 12), and the second representation (e.g., 404b) of the target 404 within the second image 750 is determined using the measurement of the distance to the target 404.

In some embodiments, the device determines (1620) target movement data, e.g., in accordance with the first representation of the target within the first image and the second representation of the target within the second image. For example, movement of the target 404 from a first time $t_1$ to a second time $t_2$ (e.g., as illustrated in FIG. 4) is determined using a change in size of the representation of the target 404 from a first size as indicated at 404a of the image 700 to a second size as indicated at 404b (e.g., as illustrated at FIGS. 7A-7B); motion information for the movable object 102 (e.g., as determined from control instructions provided to the movable object 102 and/or a motion sensor of the movable object 102, such as an accelerometer); and/or motion information for the target 404 (e.g., information determined by a motion sensor of the target 404 and transmitted from the target 404 to the movable object 102, the control unit 108, and/or the computing device 110).

In some embodiments, adjusting the exposure parameter for the imaging device includes (1622) adjusting the exposure parameter for the imaging device using the determined target movement data. For example, determining a rate of change of one or more exposure parameters includes determining an expected future movement of the target based on (current) target movement data as described with regard to (1620).

In some embodiments, the device applies (1624) a second adjustment to the exposure parameter for the imaging device using the determined target movement data. For example, one or more exposure parameters are determined using expected future movement of the target based (current) on target movement data as described with regard to (1620).

In some embodiments, the data corresponding to the second representation of the target in the second image includes (1626) a plurality of light levels determined for distinct points of the second representation of the target (e.g., equally or otherwise distributed across the second representation) and adjusting the exposure parameter includes: determining an average value based on the plurality of light levels; and adjusting the exposure parameter in accordance with the determined average value. For example, a plurality of light levels are determined for areas of the image sensor 302 that correspond to multi-zone metering areas, e.g., as shown at 806-1 to 806-5 of FIGS. 8, 906-1 to 906-5 of FIGS. 9, 1106-1 to 1106-13 of FIG. 11, and/or 1306-1 to 1306-13 of FIG. 13.

In some embodiments, the adjustment to the exposure parameter is determined (1628) using data corresponding to at least one portion of the second image that is outside a region corresponding to the second representation of the target. For example, in FIG. 11, multi-zone metering areas 1106-1 to 1106-13 are at least partially outside the region 702a corresponding to the representation 404a of the target 404 and metering area 902 is inside the region 702a.

In some embodiments, adjusting the exposure parameter comprises weighting (1630) the data corresponding to the second representation 404b of the target 404 in the second image 750 more highly than the data corresponding to the at least one portion of the second image that is outside the region corresponding to the second representation 404b of the target. For example, one or more light level values determined at locations that correspond to the metering area 902 are weighted more highly than one or more light level values determined at locations that correspond to the metering areas 1106-1 to 1106-13, e.g., as described with regard to FIG. 11.

In some embodiments, receiving the user indication of the target 404 for imaging includes receiving (1632) input data indicating a region (e.g., 702a, 702b, and/or 1502) corresponding to the target 404 within a prior image 1500 captured by the imaging device. For example, a user points to the target 404 displayed by the display 1402 of the control unit 108 to indicate a region (e.g., as defined by a boundary 702b and/or a boundary 1502) that corresponds to the target 404.

In some embodiments, the device transmits (1634), to a remote device (e.g., a control device 108), an indication of a region that corresponds to the target. For example, the region 702b that corresponds to the representation of the target 404b in the image 750 is transmitted by the movable object 102 to the control device 108 (e.g., and is displayed by the control device 108).

Many features of the present disclosure can be performed in, using, or with the assistance of hardware, software, firmware, or combinations thereof. Consequently, features of the present disclosure may be implemented using a processing system. Exemplary processing systems (e.g., processor(s) 202) include, without limitation, one or more general purpose microprocessors (for example, single or multi-core processors), application-specific integrated circuits, application-specific instruction-set processors, field-programmable gate arrays, graphics processing units, physics processing units, digital signal processing units, coprocessors, network processing units, audio processing units, encryption processing units, and the like.

Features of the present disclosure can be implemented in, using, or with the assistance of a computer program product, such as a storage medium (media) or computer readable storage medium (media) having instructions stored thereon/in which can be used to program a processing system to perform any of the features presented herein. The storage medium (e.g., the memory 204) can include, but is not limited to, any type of disk including floppy disks, optical discs, DVD, CD-ROMs, microdrive, and magneto-optical disks, ROMs, RAMs, EPROMs, EEPROMs, DRAMs, VRAMs, DDR RAMs, flash memory devices, magnetic or optical cards, nanosystems (including molecular memory ICs), or any type of media or device suitable for storing instructions and/or data.

Stored on any one of the machine readable medium (media), features of the present disclosure can be incorporated in software and/or firmware for controlling the hardware of a processing system, and for enabling a processing system to interact with other mechanism utilizing the results of the present disclosure. Such software or firmware may include, but is not limited to, application code, device drivers, operating systems, and execution environments/containers.

Communication systems as referred to herein (e.g., the communication system 206) optionally communicate via wired and/or wireless communication connections. For example, communication systems optionally receive and send RF signals, also called electromagnetic signals. RF circuitry of the communication systems convert electrical signals to/from electromagnetic signals and communicate with communications networks and other communications devices via the electromagnetic signals. RF circuitry optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

While various embodiments of the present disclosure have been described above, it should be understood that they have been presented by way of example, and not limitation. It will be apparent to persons skilled in the relevant art that various changes in form and detail can be made therein without departing from the spirit and scope of the disclosure.

The present disclosure has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the disclosure.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the invention be defined by the following claims and their equivalence.

What is claimed is:

1. A method for adjusting image exposure, the method comprising:
    while continuously tracking one or more targets using an imaging device mounted on a movable object:
        receiving a user indication of a target for imaging;

determining, by the imaging device, a first representation of the target;
capturing, by the imaging device, a first image that includes the first representation of the target;
determining an exposure parameter for the imaging device using data in the first image that corresponds to the first representation of the target;
determining, by the imaging device, a second representation of the target;
capturing, by the imaging device, a second image including the second representation of the target;
determining target movement data in accordance with the first representation of the target within the first image and the second representation of the target within the second image, and motion information of the target determined by a motion sensor of the target; and
adjusting the exposure parameter for the imaging device using data in the second image that corresponds to the second representation of the target, including:
adjusting the exposure parameter for the imaging device using the determined target movement data.

2. The method of claim 1, further comprising:
acquiring, by one or more sensors, a measurement of a distance to the target;
wherein the second representation of the target within the second image is determined using the measurement of the distance to the target.

3. The method of claim 1, further comprising:
adjusting the exposure parameter for the imaging device again using the determined target movement data.

4. The method of claim 1, wherein:
the data that corresponds to the second representation of the target in the second image comprises a plurality of light levels determined for distinct points of the second representation of the target; and
adjusting the exposure parameter comprises:
determining an average value based on the plurality of light levels; and
adjusting the exposure parameter in accordance with the determined average value.

5. The method of claim 1, wherein adjusting the exposure parameter comprises adjusting the exposure parameter using data that corresponds to at least one portion of the second image that is outside a region that corresponds to the second representation of the target.

6. The method of claim 5, wherein adjusting the exposure parameter comprises weighting the data that corresponds to the second representation of the target in the second image more highly than the data that corresponds to the at least one portion of the second image that is outside the region that corresponds to the second representation of the target.

7. The method of claim 1, wherein receiving the user indication of the target for imaging comprises receiving input data indicating a region that corresponds to the target within a prior image captured by the imaging device.

8. The method of claim 1, further comprising:
transmitting, to a remote device, an indication of a region that corresponds to the target.

9. An unmanned aerial vehicle (UAV), comprising:
a propulsion system;
an imaging device; and
one or more processors coupled to the propulsion system and the imaging device, and configured for, while continuously tracking one or more targets using the imaging device of the UAV:
receiving a user indication of a target for imaging;
determining, through the imaging device, a first representation of the target;
capturing, through the imaging device, a first image that includes the first representation of the target;
determining an exposure parameter for the imaging device using data in the first image that corresponds to the first representation of the target;
determining, through the imaging device, a second representation of the target;
capturing, through the imaging device, a second image including the second representation of the target;
determining target movement data in accordance with the first representation of the target within the first image and the second representation of the target within the second image, and motion information of the target determined by a motion sensor of the target; and
adjusting the exposure parameter for the imaging device using data in the second image that corresponds to the second representation of the target, including:
adjusting the exposure parameter for the imaging device using the determined target movement data.

10. The UAV of claim 9, wherein:
the one or more processors are further configured for acquiring, through one or more sensors, a measurement of a distance to the target; and
the second representation of the target within the second image is determined using the measurement of the distance to the target.

11. The UAV of claim 9, wherein the one or more processors are further configured for:
adjusting the exposure parameter for the imaging device again using the determined target movement data.

12. The UAV of claim 9, wherein:
the data that corresponds to the second representation of the target in the second image comprises a plurality of light levels determined for distinct points of the second representation of the target; and
adjusting the exposure parameter comprises:
determining an average value based on the plurality of light levels; and
adjusting the exposure parameter in accordance with the determined average value.

13. The UAV of claim 9, wherein the one or more processors are further configured for adjusting the exposure parameter using data that corresponds to at least one portion of the second image that is outside a region that corresponds to the second representation of the target.

14. The UAV of claim 13, wherein adjusting the exposure parameter comprises weighting the data that corresponds to the second representation of the target in the second image more highly than the data that corresponds to the at least one portion of the second image that is outside the region that corresponds to the second representation of the target.

15. The UAV of claim 9, wherein receiving the user indication of the target for imaging comprises receiving input data indicating a region that corresponds to the target within a prior image captured by the imaging device.

16. The UAV of claim 9, wherein the one or more processors are further configured for transmitting, to a remote device, an indication of a region that corresponds to the target.

17. A system for adjusting image exposure, the system comprising:
   an imaging device; and
   one or more processors coupled to the imaging device and configured for, while continuously tracking one or more targets using the imaging device:
      receiving a user indication of a target for imaging;
      determining, through the imaging device, a first representation of the target;
      capturing, through the imaging device, a first image that includes the first representation of the target;
      determining an exposure parameter for the imaging device using data in the first image that corresponds to the first representation of the target;
      determining, through the imaging device, a second representation of the target;
      capturing, through the imaging device, a second image including the second representation of the target;
      determining target movement data in accordance with the first representation of the target within the first image and the second representation of the target within the second image, and motion information of the target determined by a motion sensor of the target; and
      adjusting the exposure parameter for the imaging device using data in the second image that corresponds to the second representation of the target, including:
         adjusting the exposure parameter for the imaging device using the determined target movement data.

18. The system of claim 17, wherein:
   the one or more processors are further configured for acquiring, by one or more sensors, a measurement of a distance to the target; and
   the second representation of the target within the second image is determined using the measurement of the distance to the target.

19. The system of claim 17, wherein the one or more processors are further configured for:
   adjusting the exposure parameter for the imaging device again using the determined target movement data.

20. The system of claim 17, wherein:
   the data that corresponds to the second representation of the target in the second image comprises a plurality of light levels determined for distinct points of the second representation of the target; and
   adjusting the exposure parameter comprises:
      determining an average value based on the plurality of light levels; and
      adjusting the exposure parameter in accordance with the determined average value.

21. The system of claim 17, wherein the one or more processors are further configured for adjusting the exposure parameter using data that corresponds to at least one portion of the second image that is outside a region that corresponds to the second representation of the target, the data that corresponds to the second representation of the target in the second image being weighted more highly than the data that corresponds to the at least one portion of the second image that is outside the region that corresponds to the second representation of the target.

22. The system of claim 17, wherein receiving the user indication of the target for imaging comprises receiving input data indicating a region that corresponds to the target within a prior image captured by the imaging device.

* * * * *